US008998717B2

(12) United States Patent
Parke et al.

(10) Patent No.: US 8,998,717 B2
(45) Date of Patent: Apr. 7, 2015

(54) DEVICE AND METHOD FOR RECONSTRUCTING AND ANALYZING MOTION OF A RIGID BODY

(71) Applicants: Gordon Parke, Winnipeg (CA); Adam Tsouras, Winnipeg (CA); Eytan Moudahi, Pickering (CA)

(72) Inventors: Gordon Parke, Winnipeg (CA); Adam Tsouras, Winnipeg (CA); Eytan Moudahi, Pickering (CA)

(73) Assignee: PPG Technologies, Inc., Winnipeg (CA)

( * ) Notice: Subject to any disclaimer, the term of this patent is extended or adjusted under 35 U.S.C. 154(b) by 84 days.

(21) Appl. No.: 13/744,308

(22) Filed: Jan. 17, 2013

(65) Prior Publication Data

US 2014/0200094 A1   Jul. 17, 2014

(51) Int. Cl.
    *A63B 69/36*     (2006.01)
    *A63F 13/00*     (2014.01)
    *A63F 13/211*     (2014.01)
    *A63F 13/428*     (2014.01)
    *G06T 7/20*     (2006.01)

(52) U.S. Cl.
CPC . *G06T 7/20* (2013.01); *A63F 13/00* (2013.01); *A63F 13/211* (2013.01); *A63F 13/428* (2013.01)

(58) Field of Classification Search
USPC ............................................. 473/223; 700/91
See application file for complete search history.

(56) References Cited

U.S. PATENT DOCUMENTS

| 5,342,054 | A | 8/1994 | Chang et al. |
| 6,033,370 | A | 3/2000 | Reinbold et al. |
| 7,219,033 | B2 | 5/2007 | Kolen |
| 7,736,242 | B2 * | 6/2010 | Stites et al. ................... 473/221 |
| 7,871,333 | B1 | 1/2011 | Davenport et al. |
| 8,210,960 | B1 | 7/2012 | Davenport |
| 8,221,257 | B2 | 7/2012 | Davenport |
| 8,425,340 | B2 | 4/2013 | Davenport |
| 8,668,595 | B2 * | 3/2014 | Boyd et al. .................... 473/223 |
| 2005/0032582 | A1 | 2/2005 | Mahajan et al. |
| 2005/0054457 | A1 | 3/2005 | Eyestone et al. |
| 2006/0025229 | A1 * | 2/2006 | Mahajan et al. ............. 473/131 |
| 2007/0135225 | A1 | 6/2007 | Nieminen et al. |

(Continued)

FOREIGN PATENT DOCUMENTS

| CA | 2 560 023 | 10/2005 |
| CA | 2 595 793 | 8/2006 |

OTHER PUBLICATIONS

International Search Report and Written Opinion issued Apr. 28, 2014 in PCT/CA2014/000031.

(Continued)

*Primary Examiner* — Masud Ahmed
(74) *Attorney, Agent, or Firm* — Oblon, McClelland, Maier & Neustadt, L.L.P.

(57) ABSTRACT

An information processing apparatus includes circuitry configured to acquire information corresponding to a reference orientation that indicates a spatial position of a sensor unit attached to a golf club. The reference orientation is determined based on a vector projecting in a normal direction from a planar surface of the golf club. The circuitry acquires a measurement signal generated by the sensor unit in response to a movement of the golf club, the measurement signal including measurements of one or more of an angular acceleration, a linear acceleration, and an angular velocity. The circuitry generates data corresponding to a motion path of the golf club based on the measurement signal and the reference orientation. The circuitry controls an interface to output the generated data corresponding to the motion path.

23 Claims, 11 Drawing Sheets

(56) References Cited

U.S. PATENT DOCUMENTS

| | | |
|---|---|---|
| 2010/0093458 A1 | 4/2010 | Davenport et al. |
| 2010/0093463 A1 | 4/2010 | Davenport et al. |
| 2010/0216564 A1* | 8/2010 | Stites et al. .................. 473/223 |
| 2011/0224012 A1 | 9/2011 | Hashimoto et al. |
| 2011/0313552 A1 | 12/2011 | Davenport |
| 2012/0046119 A1 | 2/2012 | Davenport |
| 2012/0052972 A1* | 3/2012 | Bentley ........................ 473/223 |
| 2012/0100923 A1 | 4/2012 | Davenport |
| 2012/0115626 A1 | 5/2012 | Davenport |
| 2012/0277015 A1* | 11/2012 | Boyd et al. .................. 473/223 |
| 2012/0277016 A1* | 11/2012 | Boyd et al. .................. 473/223 |
| 2012/0329568 A1* | 12/2012 | Stites et al. .................. 473/223 |
| 2013/0059672 A1 | 3/2013 | Davenport |
| 2013/0072316 A1* | 3/2013 | Morin et al. .................. 473/223 |
| 2013/0085007 A1 | 4/2013 | Davenport |
| 2013/0090179 A1 | 4/2013 | Davenport |
| 2014/0073446 A1 | 3/2014 | Davenport |

OTHER PUBLICATIONS

"I got my Swingbyte! What do I do?: Swingbyte", https://swingbyte.zendesk.com/entries/21433803-i-got-my-swingbyte-what-do-i-do.

"Mobile golf swing analysis on your phone or tablet I Swingbyte", http://www.swingbyte.com/how_it_works.

US Office Action issued in U.S. Appl. No. 13/005,163, filed Jan. 12, 2011.

* cited by examiner

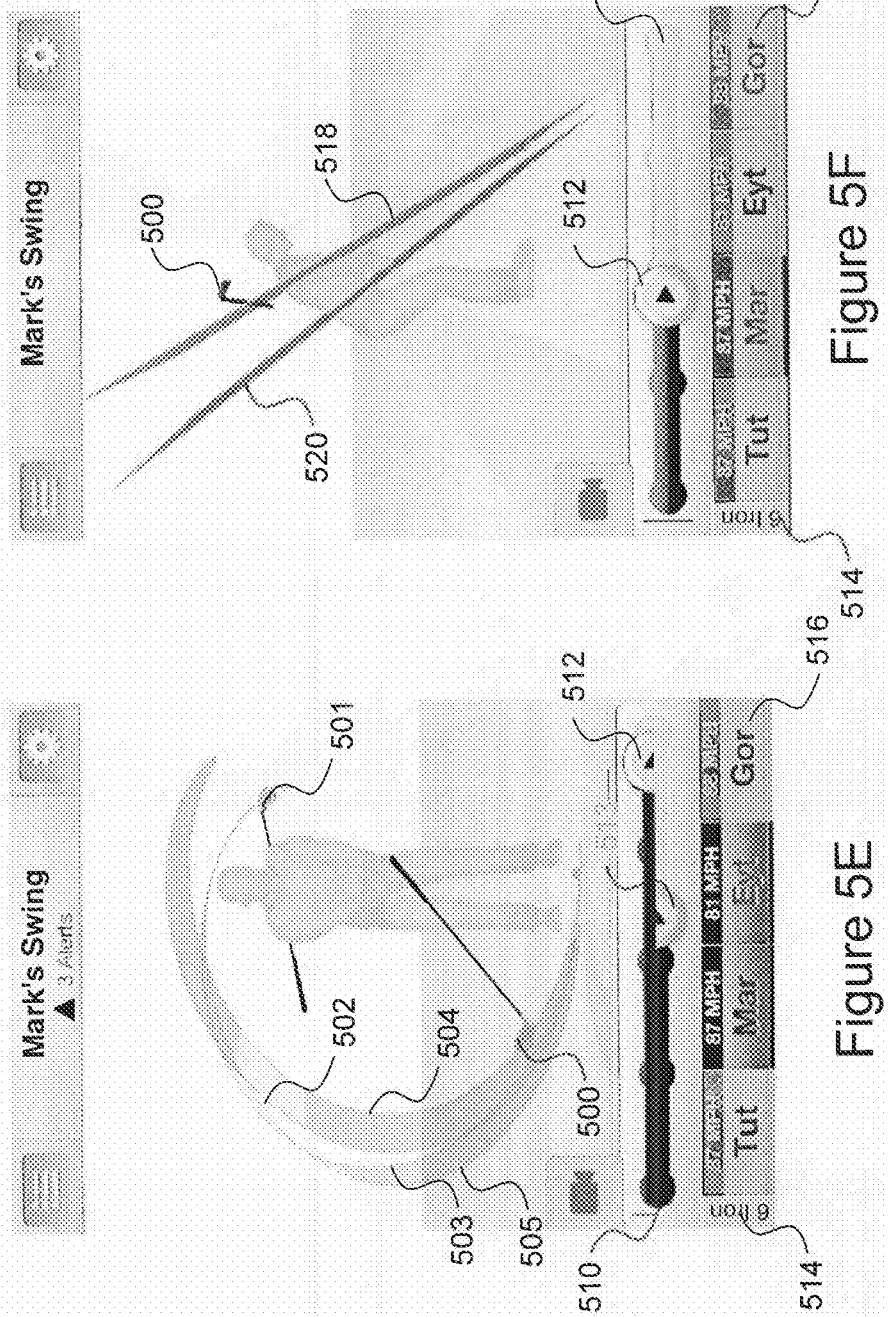

US 8,998,717 B2

DEVICE AND METHOD FOR RECONSTRUCTING AND ANALYZING MOTION OF A RIGID BODY

CROSS-REFERENCE TO RELATED APPLICATIONS

This application relates to and incorporates by reference the disclosures of U.S. patent application Ser. No. 13/744,294, filed Jan. 17, 2013, and U.S. patent application Ser. No. 13/744,300, filed Jan. 17, 2013.

BACKGROUND

1. Field of Disclosure

The present disclosure relates to measuring motion in a rigid body, and reconstructing the measured motion such that subsequent analysis may be performed.

2. Description of the Related Art

In an effort to improve performance, golfers often seek instruction and feedback on golf swing technique. For example, a swing coach may evaluate a golfer's swing motion during a lesson, and provide critique based on ideal characteristics of a swing. Additionally, devices that optically track the motion of a golf club during a golf swing are used, e.g., when fitting a golfer for custom clubs.

SUMMARY

Among other things, the present disclosure describes an information processing apparatus that includes circuitry configured to acquire information corresponding to a reference orientation that indicates a spatial position of a sensor unit attached to a golf club. The reference orientation can be determined based on a vector projecting in a normal direction from a planar surface of the golf club. The circuitry can acquire a measurement signal generated by the sensor unit in response to a movement of the golf club. The measurement signal can include measurements of one or more of an angular acceleration, a linear acceleration, and an angular velocity. The circuitry can generate data corresponding to a motion path of the golf club based on the measurement signal and the reference orientation. The circuitry can control an interface to output the generated data corresponding to the motion path.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIGS. 5A-L illustrate exemplary motion reconstruction and analysis displays.

DETAILED DESCRIPTION

Figure 1:
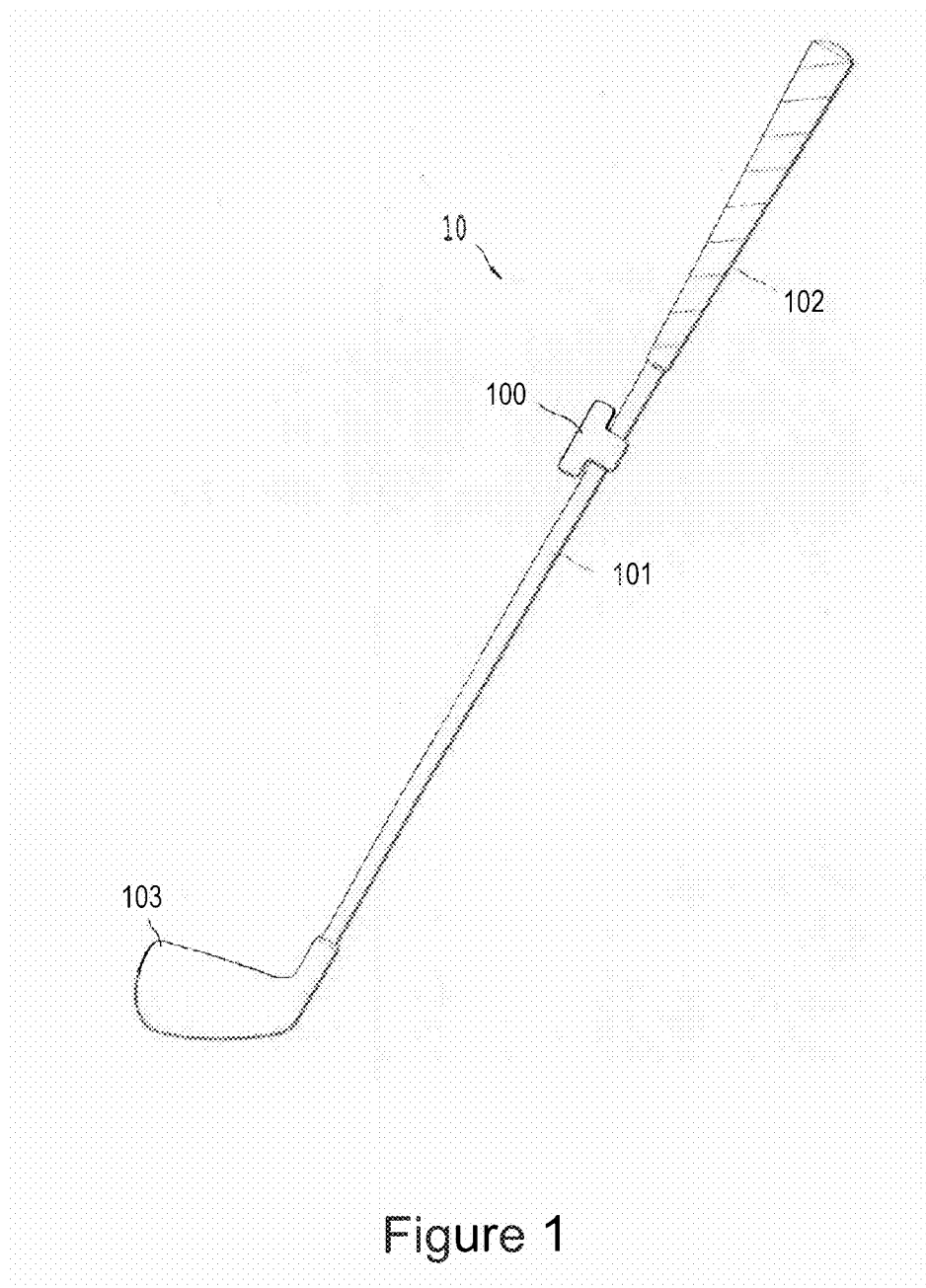
FIG. 1 illustrates an exemplary arrangement of a motion analysis unit on a golf club.

Referring now to the drawings, wherein like reference numerals designate identical or corresponding parts throughout the several views.

FIG. 1 illustrates an exemplary arrangement for a motion analysis unit 100 on a golf club 10. The arrangement of FIG. 1 illustrates the motion analysis unit 100 affixed to a shaft 101 of the golf club 10; however, this arrangement is not limiting, and the motion analysis unit 100 may easily be adapted to fit other elements of the golf club 10. For example, the motion analysis unit 100 may be affixed to the end of the grip 102, or may be located internal to the shaft 101 or the grip 102. Further, the motion analysis unit 100 may be a mobile device separated from the golf club 10, such as a smart phone or other mobile device, which receives raw sensor data for performing the motion analysis features described herein.

As will be described in further detail throughout the present disclosure, the motion analysis unit 100 may be configured such that a position of every point on the rigid body defined by the golf club 10 is known relative to the motion analysis unit 100. For example, the motion analysis unit 100 may be calibrated using properties of motion for a rigid body such that features of the golf club 10 are determined. The calibration may determine, e.g., the club's lie, loft, face normal, face angle, and the distance between the motion analysis unit 100 and the club head 103. After determining the orientation of various points on the golf club 10 relative to the motion analysis unit 100, motion of the golf club 10 in three-dimensional (3D) space may be analyzed and reconstructed by the motion analysis unit 100 in real-time. For example, the motion analysis unit 100 may determine 3D spatial coordinates of the golf club 10 during a golf swing, and translate the determined spatial coordinates to a graphical interface such that a golfer can visually analyze features of his/her golf swing.

Figure 2:
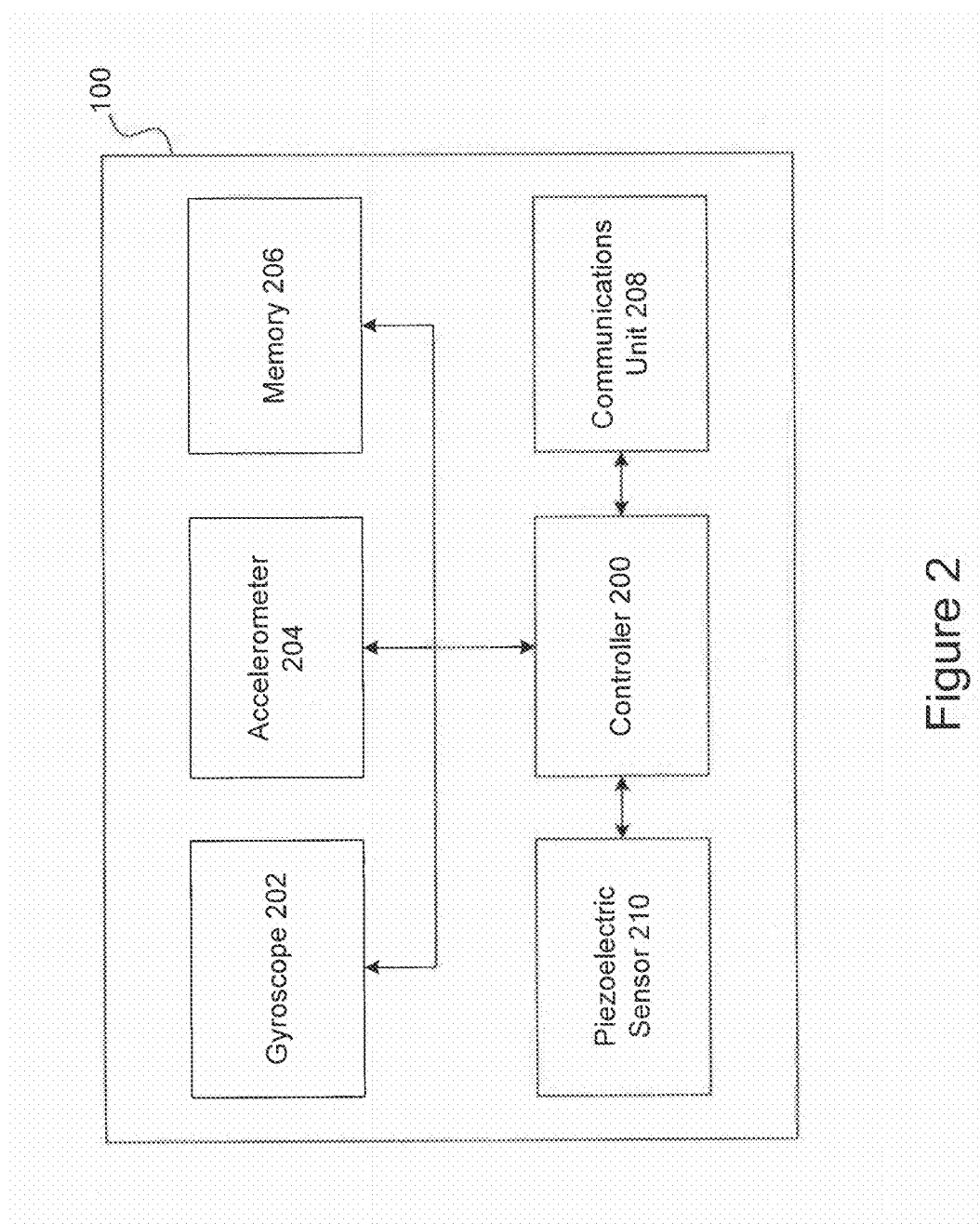
FIG. 2 illustrates an exemplary block diagram for a motion analysis unit.

FIG. 2 illustrates an exemplary block diagram for the motion analysis unit 100. The motion analysis unit 100 of FIG. 2 includes a controller 200, a gyroscope 202, an accelerometer 204, a memory 206, and a communications unit 208. The controller 200 may be any processor unit capable of executing instructions stored on the memory 206. The gyroscope 202 is a device for measuring motion around an axis, including the angular velocity of the motion analysis unit 100 with respect to a given axis. The accelerometer 204 is a device for measuring the angular and/or linear acceleration of the motion analysis unit 100 relative to a local inertial frame, and may output the acceleration as a vector quantity including magnitude and orientation. The memory 206 is a memory unit including volatile memory, non-volatile memory, or a combination thereof, and may be utilized by the controller 200 for storage during the motion analysis and reconstruction processing of the present disclosure. Lastly, the communications unit 208 is a device for communicating with other external devices, such as a smart phone. The communications unit 208 may send and receive signals using a wireless or wired communications protocol, such as Wi-Fi, Bluetooth, Ethernet, a cellular network, or the like.

Figure 3:
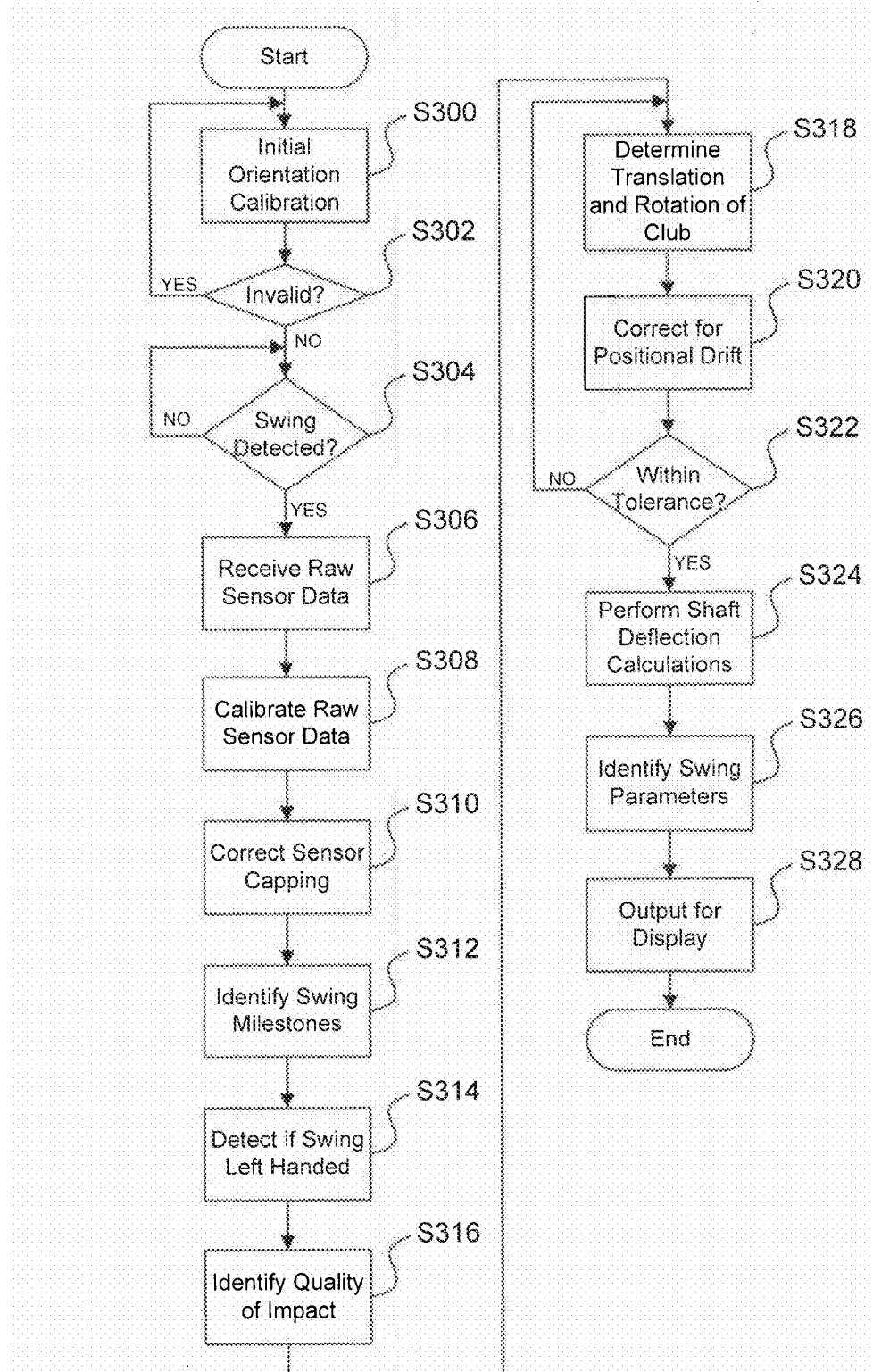
FIG. 3 illustrates an exemplary flow chart for motion analysis and reconstruction processing.

Next, FIG. 3 illustrates an exemplary flow diagram for motion analysis processing performed by the exemplary motion analysis unit 100 of FIG. 2.

Referring to FIG. 3, the controller 200 performs an initial orientation calibration at step S300. As stated previously, the present disclosure assumes the relative position and orientation of points on a rigid body relative to the motion analysis unit 100 may be determined in advance such that features of a golf swing (e.g., swing plane, club head speed, shaft lean) may subsequently be derived based on, e.g., a measured angular velocity, angular acceleration, and/or linear acceleration. That is, if the relative position and orientation of the motion analysis unit 100 with respect to the golf club 10 is known, then the movement of the golf club 10 can be reconstructed using relationships of motion on a rigid body in an inertial plane.

The controller 200 may also continually evaluate whether the initial orientation calibration remains valid (S302). In general, the initial orientation calibration is invalidated when the position and orientation of the golf club cannot be determined relative to the motion analysis unit 100. Since derivation of a particular point on a rigid body relative to a reference point on the rigid body requires the reference point to remain in the same position relative to other points on the rigid body, the initial orientation calibration would be invalidated, e.g., when the motion analysis unit 100 is removed from the golf club and/or changes positions on the club's shaft.

Calibration validations may be performed, e.g., by evaluating angular acceleration. In particular, when the motion analysis unit 100 is affixed to the club, as in the example of FIG. 1, the whole system has a much higher moment of inertia, meaning it is much less likely to rotate for a given force. In contrast, when the motion analysis unit 100 is removed from the club (e.g., when it is in your hand), it is easy to move the device back and forth in one direction or another. Therefore, if the measured angular acceleration is changing very quickly (i.e., above normal expected values for a golf swing), it is likely that the motion analysis unit 100 is displaced from the club, thereby invalidating the initial orientation calibration.

A situation where the motion analysis unit 100 remains on the club, but exhibits unusual angular acceleration, includes times when the club is swung at very high speeds. In this case, the club has a high moment of inertia, but the golfer is exerting a great deal of force and torque on the club, which results in angular acceleration varying rapidly. This may cause a false positive for invalid calibration. To address this case, the controller 200 may evaluate linear acceleration in addition to angular acceleration. If high levels of torque are exerted on the golf club during the golf swing, there will likely be high linear acceleration on the grip as well, which may be detected by the accelerometer 204. Accordingly, if high angular acceleration measurements are accompanied by high linear acceleration measurements, then the initial orientation calibration may remain valid. However, some uncertainty may be present in this determination. Thus, any indication as to the validity of the initial orientation calibration (e.g., in the metadata portion of the swing data) in this case may be withheld until subsequent swings are performed. Alternatively, an indication of an unknown calibration validation result may be displayed for information purposes.

Another exemplary scenario in which angular acceleration measurements may result in a false positive for invalid calibration occurs when a large mechanical shock vibrates the club shaft (e.g., the club head is hit on the ground). A large angular acceleration results under this scenario due to the entire shaft vibrating, which may cause the controller 200 to falsely determine that the motion analysis unit 100 is removed from the club. To address this issue, the controller 200 may evaluate total angular rotation/translation in addition to angular acceleration. For example, when angular acceleration measurements indicate that the motion analysis unit 100 may be removed from the club, the controller 200 evaluates whether the device has been rotated by a predetermined threshold angle value. In this case, the motion analysis unit 100 is on a club shaft and is vibrating—it starts moving in one direction and almost instantly it starts slowing down and moving in the other direction—however, the total angle translated remains low (e.g., 5 degrees in one direction, 5 degrees in the other). Thus, evaluating for calibration validation using total translated angle may identify a viable golf club motion rather than incorrectly identifying device removal. Total angle translation may be derived using methods such as those discussed later regarding step S318.

Another case in which initial orientation calibration invalidation may occur is when the motion analysis unit 100 gradually slips from its initial position on the club shaft (i.e., when the device is affixed to the shaft as in the example of FIG. 1, but rotates due to swing impact forces). In this case, the controller 200 may evaluate swing parameters, which are discussed later, for patterns that may indicate device slippage. For example, the controller 200 may evaluate face angle over a sequence of swings and determine that the calculated face angle value is opening gradually with each swing in the sequence. When this condition is detected, the initial orientation calibration may be flagged as invalid, e.g., in the metadata portion of the swing data.

Turning back to FIG. 3, the controller 200 at step S304 determines whether a swing of the golf club 10 is detected. Methods of detecting whether a swing occurred include analyzing motion outputs from the gyroscope 202 and/or the accelerometer 204. Further, piezoelectric sensors may also detect vibrations and determine whether the detected vibrations are indicative of a golf swing and/or ball strike. Similarly, audio sensors may be used to determine whether a detected sound is indicative of a golf swing and/or ball strike.

In response to detecting a swing at step S304, the controller 200 requests that raw sensor data, referred hereinafter as "swing data," be output from the gyroscope 202 and/or the accelerometer 204. The swing data may include the raw angular and linear acceleration data, and the rotation data respectively collected by the accelerometer 204 and the gyroscope 202 over the course of a swing. The motion analysis unit 100 sensors may be configured to continuously measure acceleration and rotation data, and then crop the measured data to fit a time period corresponding to a detected golf swing. The swing data may include metadata that is comprised of a time stamp indicating when a swing occurred, the time series corresponding to the measured acceleration and rotation, and current calibration information indicating whether the initial orientation calibration has been performed and/or remains valid. While the swing data is sent as a batch following a swing detection in the non-limiting example of FIG. 3, it should be appreciated that the motion analysis unit 100 may easily be adapted such that swing data is sent in real-time and without a swing detection. Further, the present disclosure may be implemented such that another device, such as a smart phone, receives a notification of a swing detection from the motion analysis unit 100, and in response, requests the swing data be transmitted to the device for subsequent motion analysis and graphical reconstruction.

At step S308, the received swing data is calibrated for use in subsequent processing. The data output by the gyroscope 202 and the accelerometer 204 is typically in a raw form that may not be meaningful or usable in further calculations and processing. For example, the raw swing data may include a sensitivity bias and/or an offset bias in each measurement. Accordingly, the purpose of calibrating the raw data at S308 is to take the random values coming from the motion analysis unit 100 sensors and apply calibration scaling and offset factors to make it legitimate swing data (i.e., standardized metric measurements). The controller 200 may utilize a calibration matrix and an offset matrix when calibrating the swing data.

After calibrating the swing data, the controller corrects for sensor capping at step S310. Due to limitations in the technology, the sensors used in the motion analysis unit 100 may not be capable of measuring the full range of motion for a golf swing in some cases. For example, an accelerometer may have an effective range of ±16 g. This range may be appropriate for the swing of many amateur golfers; however, many experienced golfers swing at much higher speeds and generate much higher acceleration (e.g., in excess of 20 g), which may cause the sensors to cap out (i.e., the measurements are clipped at the maximum range of the sensor). Thus, sensor capping may result in some swing data being captured inaccurately or entirely lost.

Exemplary methods of mitigating sensor capping include arranging the accelerometer 204 within the motion analysis unit 100 such that it is rotated, e.g., 45° from the axis formed by the club shaft centerline, which effectively distributes the acceleration force across multiple axes (e.g., the x and y-axis) and allows for higher acceleration measurements than any single axis could measure alone.

A second method of mitigating sensor capping is by extrapolating the measured raw data at the points at which the capping occurs. For example, if capping occurs in either sensor, then the controller 200 may evaluate the raw data to find points where the gyroscope 202 and/or the accelerometer 204 start capping. These points can be seen quite clearly because the maximum value in a respective range is achieved and subsequent time-series measurements are maintained at that maximum measurable level. In this case, the controller 200 may determine a polynomial function that includes four constraints: (1) the function matches the capping start point, (2) the function matches the capping end point, (3) the function matches the slope immediately before the capping start point, and (4) the function matches the slope immediately after the capping end point. Essentially, the controller 200 matches the polynomial function with the capping values of either end of the capped time-series function, emulates the sensor values between the capping start and end points, and continuously matches the expected sensor output curve at the capping start and end points.

Figure 4:
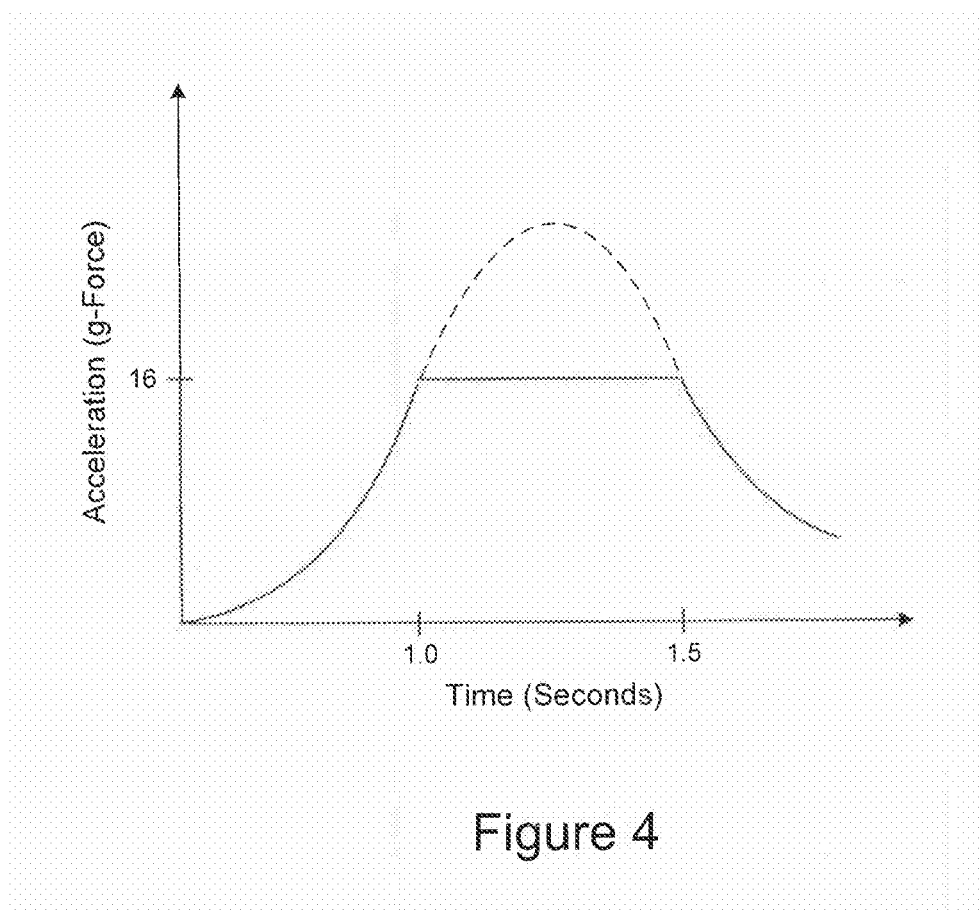
FIG. 4 is an exemplary graph illustrating interpolation processing for sensor clipping.

For illustration purposes of the latter example, FIG. 4 illustrates an exemplary accelerometer output graph, where the accelerometer has a maximum nominal range of 16 g. Referring to FIG. 4, the controller 200 identifies points t=1.0 sec and t=1.5 sec as the capping start and stop points, respectively. The controller 200 then measures the slope at these two points, and fits a polynomial function, which is illustrated by the dotted line portion of the graph, to correct for sensor capping above 16 g. The composite time-series of the uncapped measured sensor values and the fitted polynomial values may then be used for subsequent motion analysis and reconstruction processing.

Sensor capping may also be mitigated by employing sensors having increased measurement ranges; however, this can be detrimental due to decreased measurement resolution, which yields lower levels of precision in motion analysis and reconstruction.

Referring back to FIG. 3, at step S312, the controller 200 identifies key swing milestones based on the captured swing data. Swing milestones may include, e.g., the point of address (the start of the swing), the top of the backswing, the point of impact with a golf ball, and the end of swing follow-through. A point at which a swing parameter deviates from an "ideal" swing may also be a swing milestone. The swing milestones may be used as reference points for performing subsequent motion analysis and reconstruction processing. To identify the swing milestones, the controller 200 analyzes the calibrated and capping-corrected swing data for particular features indicative of a given swing milestone. The point of impact can be clearly evident by identifying huge spikes in acceleration and rotation rate in the swing data caused by striking a golf ball. Identifying the point of address is somewhat similar to impact, except the opposite principles apply—the controller 200 identifies areas in which very little (or zero) movement occurs within the swing data. While some slight movement of the club can be expected at address due to, e.g., small movements in club gripping and stance, the club head is typically resting on the ground at this point, resulting in substantially zero detected movement by the controller 200. Between the points of address and impact is the back swing, which essentially appears as an inflection point between the rotation/acceleration on the back swing and the rotation/acceleration on the down swing.

Errors may be introduced into the swing data as a result of movements not related to the swing, which may complicate identifying the swing milestones. For example, if the golfer slides his/her hands on the grip, the accelerometer measurements resultant from hand movement over the rough grip surface may appear similar to an impact, albeit not as smooth as a regular golf swing. As an additional example, the golfer can have a prolonged pause at the top of the backswing that can appear similar to an address point. Further, a golfer may not hold the club still at any point in the swing such that the point of address becomes unclear. In light of these potential problems, the controller 200 may be configured to examine the swing data as a whole rather than as compartmentalized events. In other words, the controller 200 may be configured to seek a combination of milestones that make up a swing rather than determining where a single swing milestone occurs. As a non-limiting example, the controller 200 may evaluate swing data for an entire swing, calculate a probability for a particular swing event across the entire swing data time series, and correlate a time in the swing data with a swing milestone based on the calculated probability.

The controller 200 may also utilize the identification of other milestones as further evidence of whether a particular swing milestone occurred. For example, if the controller identifies a point of impact and a point of address without detecting the top of the back swing, then the controller 200 may identify this as an error based on predetermined temporal relationships between the milestones (e.g., the top of the back swing occurs after address, but before impact).

The controller 200 may utilize a Hidden Markov Model (HMM) in the identification of swing milestones, where the swing is represented as a HMM and the controller 200 determines, for each swing milestone, the maximum likelihood of a particular swing milestone fitting together with the other swing milestones.

As a non-limiting example of identifying a swing milestone, the controller 200 may identify the point of address as the point at which the club head is held still for a predetermined time period. While this exemplary method may be effective for many golfers, the actual point of address is often difficult to determine based on swing data analysis. The difficulty arises from the fact that when many golfers are about to hit a club, they leave the club still, causing an address point to be detected, and then "waggle" the club (i.e., move the club head slightly back and forth at the address point) prior to taking a swing. Thus, the controller 200 may include the waggle motion in the swing, when in effect this is merely an extension of the address point. To combat this problem, the controller 200 may utilize the HMM to find the swing start before the waggle begins. Specifically, the controller 200 identifies an excessive movement of the club between the swing start (i.e., the actual point of address when the club is held still) and the top of the backswing, and if the excessive motion is detected the swing is invalidated and/or the waggle motion cropped from the swing data.

Next, the controller at step S314 determines, based on the swing data and the initial orientation calibration, whether the swing was left-handed. While not limiting, the present disclosure assumes processing efficiency may be increased by utilizing models directed to right-handed swings. As an alternative, both left and right-handed models may easily be implemented for execution by the controller 200. Further, the controller 200 may be configured to receive an input indicating a swing is left handed via, e.g., a graphical user interface menu.

Turning to the exemplary left-handed swing determination processing performed at S314, left-handedness affects four aspects of the swing reconstruction calculations:

1.) Face Normal Calibration. The above-described initial orientation calibration may provide a "face normal" vector, which is a vector projecting normal from the club face. However, the face normal vector that is found in the initial orientation calibration provides no information as to whether the club is right or left-handed. For example, imagine standing a left and right handed club next to each other in an upside-down "Y" shape such that their club face normals point in the same direction. In this case, both clubs would look identical from the standpoint of a face normal measurement. Absent further information, the handedness of the club cannot be determined and therefore, the remaining club features (e.g., lie, loft, face angle) are determined in the initial orientation calibration using a right-handed model.

2.) Left-Handed Detection. For simplicity, the face normal calibration may assume a swing is right handed, in which case a naive reconstruction of a left-handed swing would look correct, but with its club swapped for a mirror-image, right-handed counterpart. Therefore, before integrating the swing data to find position, as discussed later, the controller 200 evaluates the club handedness at address. If the swing data appears upside-down, with the toe pointing back and into the ground, the controller 200 may recognize that the swing was left handed. To determine this mathematically, the controller 200 takes the cross product of a vector pointing down the shaft towards the club head with a vector pointing straight down (which can be provided from the measurement of gravity). If the resulting vector points in the opposite direction as the face normal vector, as evidenced by a negative dot product between the two vectors, the swing is left handed. It should be noted that the face normal calibration, and any other aspect of the present disclosure, may easily be performed for both right and left-handed swings, and the present disclosure is not limited by any assumption of user handedness.

3.) Calculation Correction. After a swing has been identified as left-handed, the subsequent motion reconstruction calculations must be corrected. The basis behind these corrections is the recognition that any left-handed swing has a unique right-handed mirror image. By transforming all the incoming acceleration and rotation data into this mirror-image coordinate system, the motion can be reconstructed by the controller 200 as its right-handed counterpart. As a non-limiting example, a householder reflection matrix is calculated that will reflect any vector through the plane containing the club shaft and face normal (this is the same reflection that was implicitly performed in the face normal calibration by assuming a right-handed club). Note: angular velocity is a pseudovector, and therefore should be negated after the householder reflection matrix is applied.

4.) Display. For a 3D graphical reconstruction, which is described in later paragraphs, a left-handed swing may have to be flipped back from its right-handed reconstruction. This may simply involve a reflection in the modelview matrix and reversal of face normal and front-face directions. Conversely, swing parameters generally do not need to be modified. It's generally accepted that parameters are mirror-imaged for left-handed golfers—a slice for a left-hander spins off to the left rather than the usual right.

Next, the quality of impact is determined by the controller 200 at step S316. In this context, "quality of impact" may refer to a measure of impact with objects other than a golf ball during a swing. For example, quality of impact may indicate whether the golf club impacted the ground behind the golf ball during the swing, which is commonly referred to as hitting "fat." Quality of impact is important for multiple reasons. First, if a golfer strikes a portion of the ground when hitting a golf ball, the motion analysis unit 100 sensor measurements and subsequent motion reconstruction may be affected because it becomes very difficult to discern where the actual impact position (with the ball) is when the ground is the initial point of impact. In other words, hitting the ground with the club appears the same to the sensors as when the ball is hit and therefore, reconstructing the swing such that an analysis of swing features (e.g., face angle at impact) can be performed is made difficult. Thus, in addition to providing a qualitative or quantitative indication of the quality of impact for information purposes (e.g., as a user prompt on a graphical user interface), determining quality of impact also provides the ability to alert users as to the possibility of swing reconstruction errors, and in some cases to correct the errors when reconstructing the swing for motion analysis.

As a non-limiting example of detecting quality of impact, the controller may detect when the ground is hit before the ball by analyzing an amount of flex in the club shaft during impact. When a ball is hit "fat," essentially the ground pulls back on the bottom of the club head, and tilts the club shaft forward at the top. Normally on impact, the motion analysis unit 100 sensor output (i.e., from the gyroscope 202 and the accelerometer 204) shows a sharp decrease in rotation and angular acceleration at impact. However, when a golfer hits the ground early during a swing, the club shaft becomes bowed due to the resistance of the club head moving through the ground. In this case, the motion analysis unit 100 sensors typically measure rotation speeding up just before the club hits the ball due to the shaft bowing. That is, in the case where the motion analysis unit 100 is affixed to the club shaft, as in the exemplary arrangement of FIG. 1, the motion analysis unit 100 rotates during a shaft bowing more than it would otherwise for a rigid shaft. Therefore, by detecting and measuring this moment of increased rotation speed, the controller 200 can determine the quality of impact (e.g., how fat the golfer hit the ball). If the club shaft bows forward very quickly, then it is likely that the golfer struck a large portion of the ground. Likewise, if the motion analysis unit 100 sensors indicate the shaft is bowed only slightly, then the controller 200 may determine that little to no ground was impacted during the swing. The quality of impact determination may examine the height and width of the bowing peak, compare these values to a threshold, and determine a state of impact quality. Alternatively, a continuous measurement may be used in the determination. In either case, the amount of measured shaft bowing may be considered proportional to impact quality, or some other measure of impact quality may be substituted.

Quality of impact may also be taken into account during reconstruction (e.g., graphical display of the swing and/or quantitative indications of swing position). Generally we consider that the club is a rigid body throughout the entire swing. In the exemplary arrangement of FIG. 1, this results in the motion analysis unit 100 being aligned with the centerline axis of the shaft 101, with this axis pointing in the direction of the club head 103. When a swing strikes the ground, suddenly and the club shaft 101 bows forward and the rigid body assumption is no longer valid. Thus, to accurately reconstruct the swing from the swing data, the controller 200 may remove the spike in rotation rate that results from the bowing.

Next, the swing may be reconstructed by the controller 200, based on the swing data, by calculating the translation and rotation of the golf club at step S318. As previously discussed, the swing data may include at least time-stamped angular/linear acceleration and rotation measurements from the accelerometer 204 and the gyroscope 202, respectively. These measurements may be calibrated and corrected for sensor capping, such that they are translated into meaningful values for swing reconstruction. At S318, the controller 200 may perform an integration of the acceleration and angular velocity throughout the swing. In the case of determining 3D spatial position, the controller 200 integrates the acceleration once to determine velocity, and then again to determine the position (e.g., coordinates in the x-y-z axes). Similarly, the controller 200 integrates the rotation measurement from the gyroscope 202 in the swing data once to determine the angular position. Once these translations of the swing data are performed, a reconstruction of the swing may be performed such that the swing may be displayed visually and/or analyzed, e.g., to find measurements of key swing parameters, which will be described later. Translated swing data used for reconstruction is referred hereinafter as reconstructed swing data.

The reconstructed swing data may include, e.g., a time series of position, acceleration, and rotation of all points of the golf club during a swing. This data may be presented in absolute terms, or may be given relative to the position/orientation of the motion analysis unit 100. The time series may start at address and end at the point of impact, and each point in the time series may be analyzed to determine swing parameters (e.g., orientation and position of the club in 3D space). Further, the reconstructed swing data may be translated such that the information included therein is represented graphically as a reconstructed swing "replay," e.g., on a display screen.

Next, the controller 200 at step S320 corrects the reconstructed swing data for positional drift. Positional drift refers to compounding of sensor error as the swing data is translated at S318. The gyroscope 202 and the accelerometer 204 typically have some degree of inherent sensor error/accuracy. In present disclosure, positional drift occurs as the acceleration and rotation components of the swing data are integrated to determine velocity and position. For example, when the measured acceleration in the swing data is integrated to determine velocity, any senor error in the accelerometer 204 acceleration measurement is compounded by the integration. Similarly, integration of the velocity to determine position causes even further compounding of the sensor error (i.e., an exponential increase). This positional drift may result in the determined position varying from actual position very quickly. For example, absent correction for positional drift, the controller 200 may determine that the club moved 20 cm, when in actuality the club was only moved 2 cm. Such errors are clearly problematic for any meaningful quantitative or qualitative motion analysis (e.g., graphical representation of the swing, numerical swing parameter measurements).

As a non-limiting example for addressing positional drift, the controller 200 may assume various known features of a golf swing, and use the known features as reference for the correction. For example, it can be assumed that the club head starts at a very similar position at address as it does at the point of impact. Thus, if the controller 200 reconstructs a swing and determines the club head position at impact varies significantly relative to the point of address, then an error caused by positional drift is likely to have occurred. Similarly, the path of a golfer's hands during a swing typically take the approximate shape of a circle and therefore, if the reconstructed path of the golf club grip deviates significantly from this shape, the controller 200 may determine a positional drift error occurred.

In response to detecting positional drift errors, the controller 200 may adjust components in the reconstructed swing data (e.g., acceleration and rotation data) to rectify the error. Alternatively, the controller 200 may correct the swing data by adjusting the previously determined swing milestone positions (e.g., the point of address may be incorrectly identified, and the controller 200 adjusts the position). This process is preferably recursive, in that once the swing data is corrected for positional drift, the controller 200 again performs the reconstruction (i.e., step S318 in the example of FIG. 3) using the adjusted swing data. This recursive process can continue until positional drift errors are within an acceptable tolerance (S322). For example, if the reconstructed club head position at impact is determined to be 10 feet from the point of address, then the controller 200 may determine that there is an error in the accelerometer 204 bias. The controller 200 may then adjust the acceleration component of the reconstructed swing data, and re-perform the reconstruction using the adjusted swing data until the reconstructed impact and address positions closely match, within tolerance.

Next, the controller performs shaft deflection calculations at S324. Shaft deflection refers to any flexion created in the club shaft during a swing. To account for shaft deflection, the controller 200 assumes a predetermined heavy mass (i.e., the club head) is at the end of the flexible club shaft. By analyzing the acceleration and the rotation components of the swing data, the controller 200 can identify how the club might deflect based the acceleration of the club head. Correcting for shaft deflections may be important when determining the actual club positional features during a swing. For example, shaft deflections may complicate the determination of whether the club face is open or closed at impact, or when determining loft and lie at impact. In the case of loft, a small bend in the shaft can significantly alter the reconstructed loft angle, which decreases accuracy of the motion analysis and reconstruction results.

As a non-limiting example of correcting for shaft deflection, the controller 200 initially assumes that the club grip is always pointed at the club head. Under this assumption, the controller can determine how far the club grip went in front of the initial club shaft centerline axis, based on a movement of the motion analysis unit 100. Referring to the exemplary arrangement of FIG. 1, the y-axis of the motion analysis unit 100 is aligned with the centerline axis of the shaft 101. Therefore, any deviation from this axis can be measured, and the shaft deflection can be calculated based upon this deviation. Based on the calculated shaft deflection, the controller 200 can then calculate an effective increase or decrease in reconstructed swing parameters (e.g., loft and lie at impact). As an alternative, the controller 200 may utilize vibration input from the piezoelectric sensor 210 for the shaft deflection correction calculations. In this case, the vibration input is proportional to the vibration of the club shaft at impact, and as a first-order approximation the controller 200 can determine the relative proportion of club head mass to deflects in the shaft, and then apply the deflect to the swing reconstruction throughout the entirety of the swing. In any case, values for club head mass and club shaft flex may be stored in advance, determined by an external input, and/or correlated with the classification (e.g., maker, type, etc.) of the club.

Next, the controller 200 identifies swing parameters at step S326 based on the reconstructed swing data. Non-limiting examples of swing parameters that may be calculated by the controller 200 include club head speed, swing tempo, shaft lean at impact, shaft lean at address, shaft angle at top of backswing, plane skew offset, and face angle at impact. Club head speed is defined as the velocity of the club head during the swing, and may be expressed, e.g., as an average value across the swing or the maximum value achieved during the swing. Swing tempo is defined as the speed of the downswing relative to the speed of the backswing. Shaft lean is the angular offset of the club shaft centerline relative to the vertical axis. Plane skew offset is the magnitude and direction of offset in the path traveled by the golf club relative to a predetermined plane (i.e., the swing plane). Shaft angle at backswing refers to the angle formed by the shaft centerline relative to a predetermined axis. Face angle refers to the angular difference between a normal of the club face and the target line.

As discussed previously, the reconstructed swing data may include a time series describing the relative position and orientation of a golf club throughout a swing. In general, swing parameters may be calculated differently depending on what they represent; however, in this example the swing parameters may be determined by examining the time series, extracting data from a point on the time series, and applying a mathematical function to the extracted data to calculate the desired parameter. For example, to determine face angle halfway back in the backswing, the controller 200 examines the timeline, determines where in time this point occurs (e.g., half the elapsed time between address and the top of the backswing, or the angular halfway point in the swing arc to the top of the backswing), and determines the club's position and orientation at that point. Based on the determined position and orientation, the controller 200 then calculates the specified swing parameter (i.e., face angle).

Next, the controller 200 utilizes the reconstructed swing data described in the foregoing exemplary processing to graphically display a reconstructed swing "replay" and/or the swing parameters at step S328. The graphical swing reconstruction may include retrieving the reconstructed swing data time series, and building a 3D view in which the club is mapped to the display based on the timeline and an indexing of the timeline. For example, the controller 200 may display the graphical reconstruction with a timeline such that the reconstructed swing replay can be viewed sequentially, similar to a video. The controller 200 may obtain an index of the reconstructed swing data timeline, and update the position and orientation of the displayed club in real-time based on a corresponding position and orientation from the timeline. Alternatively, or in conjunction with the 3D reconstruction, the controller 200 may display calculated swing parameter numbers, such as club head speed, for any club position on the timeline. In this case, the swing parameters may be calculated for any point in the reconstructed swing data, and an instantaneous swing parameter may be displayed, e.g., as a graph, as a table, as a prompt, as a text overlay, or the like. Trend lines may also be graphically represented. For example, the controller 200 may determine club head speed continuously across the swing timeline, and display the club head speed trend such that a user can easily discern changes in this parameter at any point during the swing.

All data associated with the reconstructed swing may also be stored in memory for later use and/or for comparisons between a current swing and a past swing. Swing data may also be categorized for storage. For example, swings may be tagged or grouped according to time, date, location, club type, hole, course, practice session, and/or a custom grouping defined by a user. An interface may provide a search function for easily locating a past swing and/or a group of swings that include a particular feature. Additionally, a calendar view may be provided in the interface to easily locate and view swing data across large spans of time. Storage of the swing data also provides for the ability to share swing data, e.g., across a network to another device. Sharing swing data is advantageous, e.g., because a user can quickly share the swing data with a swing coach who may or may not be present at the time the actual swing occurred.

Exemplary aspects of displaying reconstructed swings and/or swing parameters will now be described in detail with respect to FIGS. 5A-I.

Figures 5A, 5B:
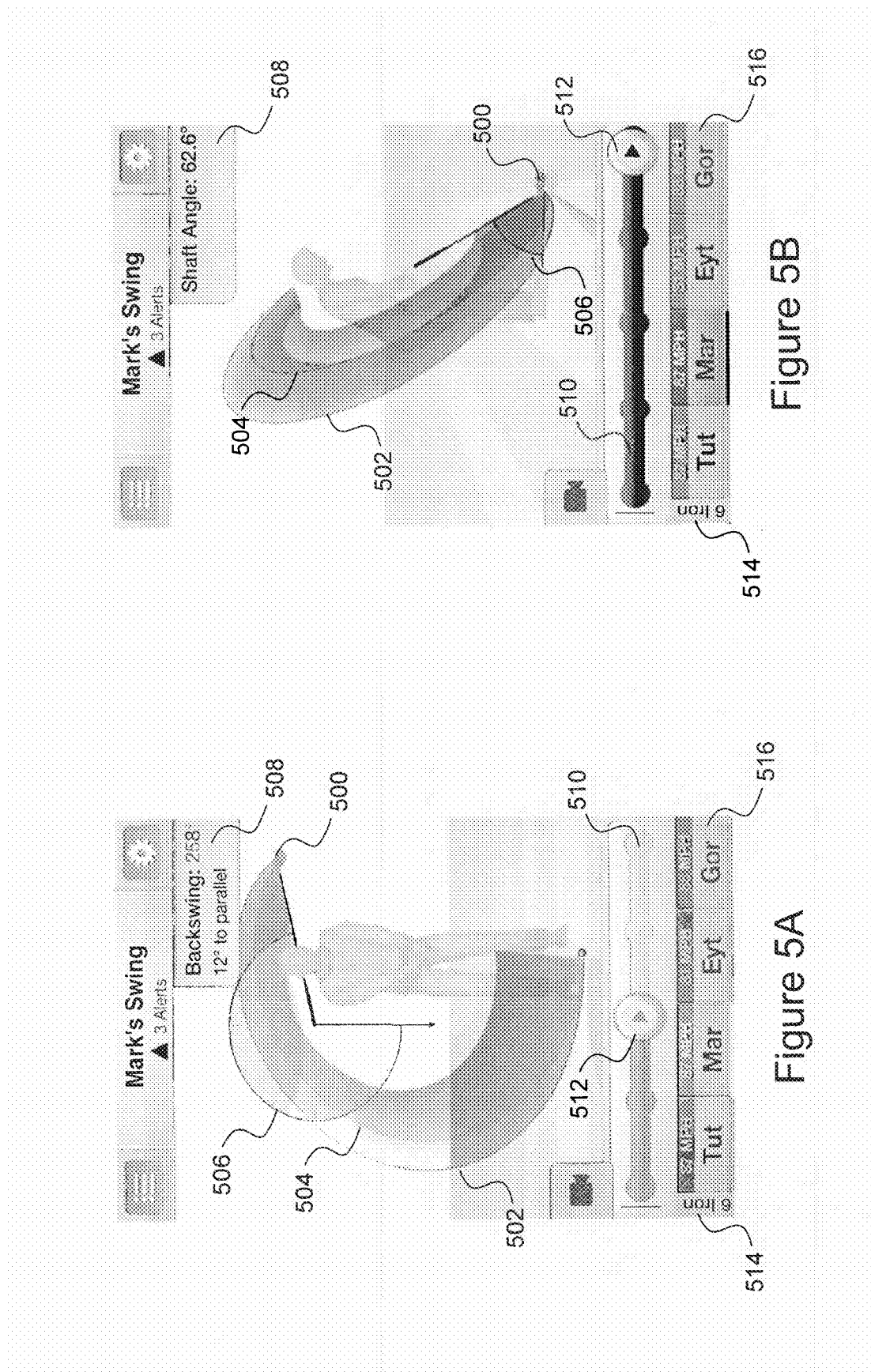

FIG. 5A illustrates one exemplary aspect of a swing reconstruction display. The exemplary display includes a graphical representation of a golf club 500, a backswing path 502, a downswing path 504, an angle indicator 506, a swing parameter prompt 508, a timeline 510, a time cursor 512, a selected club indication 514, and a player selector 516. Based on the above-described reconstructed swing data, the position and orientation of the golf club 500 may be displayed such that its path in 3D space is represented throughout the time period defined by the reconstructed swing data. That is, the golf club 500 may be displayed as a reconstructed replay of the swing position and orientation captured by the swing analysis unit 100.

The timeline 510 encompasses the entire time period elapsed during the swing, i.e., from the point of address to the point of impact. The time cursor 512 may travel along the timeline 510 during the reconstructed swing replay such that an instantaneous view of the golf club 500 position and orientation, as well as corresponding swing parameters, may be viewed by stopping the time cursor 512 on the timeline 510. The time cursor 512 may be configured to travel along the timeline 510 at the actual speed/timing at which the swing occurred. Alternatively, the time cursor 512 may travel along the timeline 510 at a speed that is faster or slower than the actual swing speed/timing. For example, the time cursor 512 may be set such that the swing is replayed in slow motion. Further, predetermined swing milestones (e.g., address, top of backswing, impact) may be represented on the timeline such that these points may be easily selected for analysis.

The backswing path 502 corresponds to the path taken by the club head of the golf club 500 during the backswing, based on the reconstructed swing data. Similarly, the downswing path 504 represents the path taken by the club head during the downswing, based on the reconstructed swing data. The backswing path 502 and the downswing path 504 may be represented in the display such that they are easily distinguishable for comparison purposes. For example, the color of the backswing path 502 might be different than the color of the downswing path 504 on the display. Further, "ideal" swing paths may be displayed on the swing reconstruction display such that a user may visually analyze differences between their reconstructed swing and the ideal swing. Additionally, as will be described later, additional swing training aids (e.g., a swing plane) may be displayed on the swing reconstruction display such that a user may analyze a reconstructed swing relative to the training aid.

The angle indicator 506 represents an angle of the golf club 502 relative to a predetermined reference position. In the exemplary display of FIG. 5A, the angle indicator 506 represents the position of the golf club 500 shaft using the point of address as a reference point. It should be noted that the angle indicator 506 may be easily configured to display other angles, such as shaft lean and face angle.

The swing parameter prompt 508 provides a numerical display of measured swing parameters determined during the above-described motion analysis and reconstruction. In the example of FIG. 5A, the swing parameter prompt displays a numerical value of the backswing angle relative to a parallel plane formed by the ground. The swing parameter prompt 508 may be overlaid on the display such that the reconstructed swing replay is displayed simultaneously with the numerical swing parameter prompt. Overlaying the swing parameter prompt 508 on the display with the reconstructed swing replay provides the benefit of a more meaningful swing analysis by allowing a user to visually interpret what a particular swing parameter represents on the display. For example, merely displaying numerically that a swing parameter such as face angle is 3° open may not be particularly useful to a user when displayed alone. However, overlaying the swing parameter prompt 508 such that the swing parameter is displayed simultaneously with a visual representation of the corresponding swing parameter may increase a user's understanding of what the swing parameter represents, thereby providing more beneficial analysis.

The swing parameter prompt 508 may also be overlaid at any position on the display. For example, the swing parameter prompt 508 may be overlaid at a position near a point on the club/swing path that the parameter shown in the swing parameter prompt 508 is referring to. The swing parameter prompt 508 may also display an arrow, or similar indicator, to highlight an aspect of the displayed club and/or swing path to which the swing parameter prompt 508 is currently referring to. Further, the swing parameter prompt 508 may display a swing parameter measurement in response to an input identifying a point on the displayed club or swing path. For example, the swing parameter prompt 508 may display a swing parameter measurement for face angle in response to a user touching the displayed club face on a touch screen. Similarly, the time cursor 512 may move along the timeline 510 in response to a user touching a point on the backswing path 502 or the downswing path 504, and display a corresponding predetermined swing parameter at that point.

The swing parameter prompt 508 may additionally display an indication (e.g., an alert, a numerical value, a text description) indicating that a particular swing parameter differs by a predetermined amount from an "ideal" value of the swing parameter. This feature provides the benefit of informing a user as to the point of a swing that should be addressed to better comply with an "ideal" swing. Further, links may be provided for further information regarding improving a particular swing parameter. For example, a link may further explain a particular parameter, provide textual "coaching" on how to improve an aspect of a swing, and/or display a training video demonstrating proper swing technique.

The selected club indication 514 represents the current club being displayed in the swing reconstruction replay. The golf club used in a swing reconstruction may be determined via an external input, or may be determined automatically by the swing analysis unit 100. For example, the swing analysis unit 100 may determine a club used for a swing during the initial orientation calibration processing described above. The selected club indication 514 provides the benefit of easily determining which club is used during a swing reconstruction replay, which is important to a golfer since a swing path may differ according to the club being used.

The player selector 516 indicates a player associated with the reconstructed swing replay. As will be described later, multiple swings corresponding to multiple players may be graphically reconstructed and displayed simultaneously for comparison purposes. It should also be noted, that the player selector 516 may be easily configured such that swings from the same player using multiple clubs may be easily selected and/or displayed simultaneously. Further, archived swings may be stored in the memory 206, where the archived swing may correspond to a swing reconstruction of, e.g., a professional golfer, which may allow a user to compare his or her own reconstructed swing with that of a professional. The archived swings may be received by the swing analysis unit 100 via the communications unit 208, and may be stored in advance.

Next, FIG. 5B illustrates another exemplary aspect of a swing reconstruction display according to the present disclosure. The exemplary display of FIG. 5B illustrates a "down range" prospective of a reconstructed golf swing replay. An alternative prospective for a reconstructed swing replay provides the benefit of allowing a user to visually analyze a swing from multiple angles, and also provides an improved vantage point for viewing particular swing parameters that may be best suited for alternative viewpoints. For example, the display of FIG. 5B illustrates that angle indicator 506 is measuring the angle between the club shaft and the ground, i.e., the shaft angle at the point of impact, which may not be easily distinguished in a front-facing view. Similarly, the swing parameter prompt 508 indicates the numerical reconstructed measured value for the shaft angle at impact. Alternative perspectives of a graphical swing reconstruction replay may be automatically presented based on a selected swing parameter. Alternatively, the user may manually select an alternative perspective. Moreover, the motion reconstruction display viewing perspective may be changed based on an input for changing the perspective. For example, a touch screen may be used so that a user may "rotate" the swing reconstruction replay such that it can be viewed in three-dimensions from alternate perspectives.

Figures 5C, 5D:
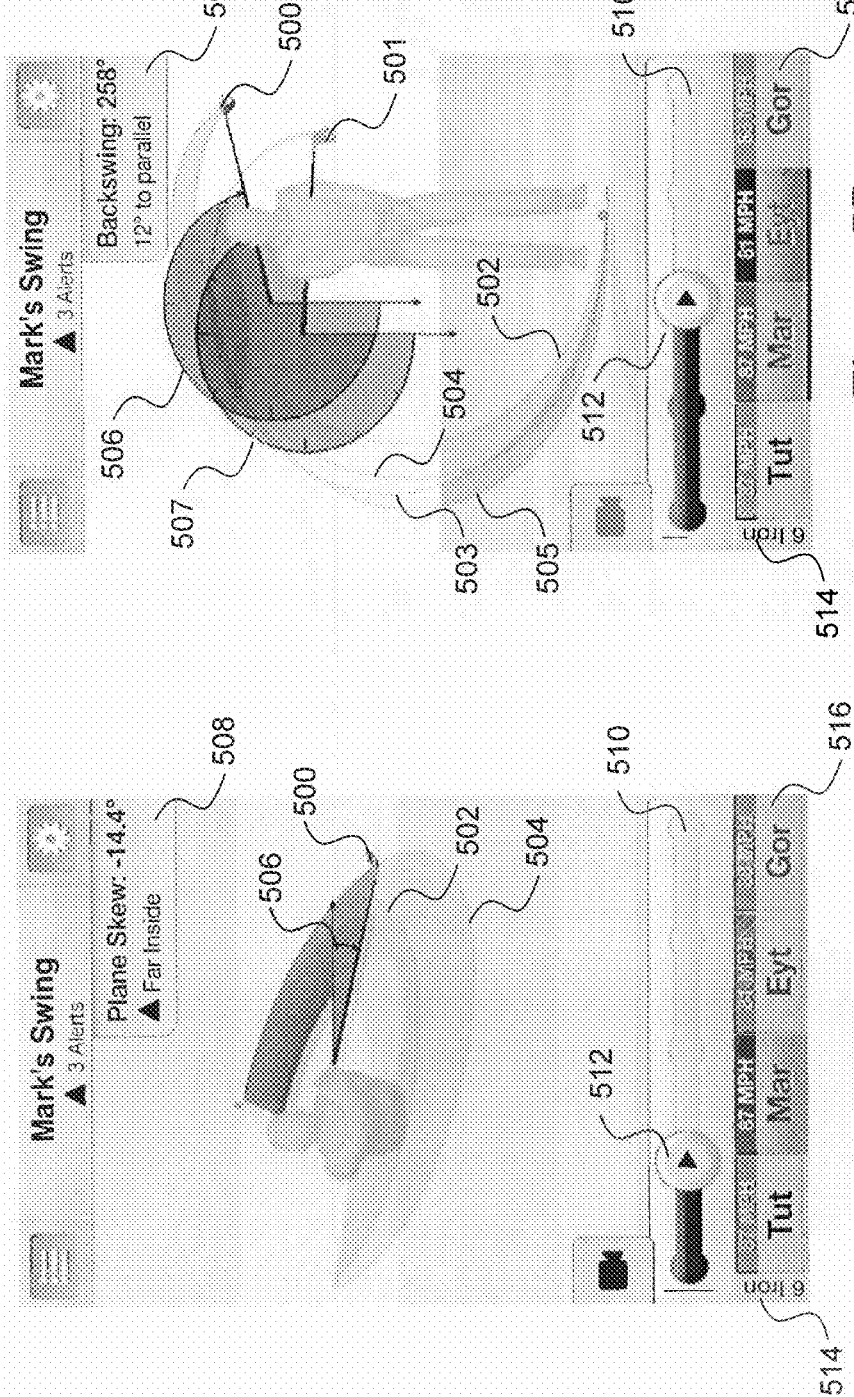

Next, FIG. 5C illustrates another aspect of an exemplary swing reconstruction display. The exemplary display of FIG. 5C illustrates another alternative perspective for a swing reconstruction replay. In this example, the swing reconstruction is graphically reconstructed and displayed to the user from a top-view perspective. In this case, a top view perspective representation permits a user to visually analyze, e.g., a distance at which the club is drawn inside or outside a reference. Angle indicator 506 in this case provides a visual representation of plane skew, and swing parameter prompt 508 displays a numerical value of plane skew, together with an alert that the plane skew is too far inside during the reconstructed swing.

The exemplary display of FIG. 5C also includes an alert in the swing parameter prompt 508, which indicates the reconstructed swing is offset from a predetermined swing parameter. Other indications may be displayed for alerting a user of differences between a reconstructed swing parameter/path and an ideal swing parameter/path. For example, a portion of the reconstructed swing path which differs from the idea swing may be shown in a different color, and/or a region located between the reconstructed swing path and a displayed ideal swing path may be shaded to visually indicate the degree to which the two paths differ.

FIG. 5D illustrates another aspect of an exemplary swing reconstruction display. As stated previously, multiple swings may be analyzed and reconstructed for display. In the example of FIG. 5D, two swings from the golf club 500 and a golf club 501 are displayed simultaneously. In this case, any point along the timeline 510 may be selected such that the swings from the golf club 500 and the golf club 501 are compared at that instance. In addition to the backswing path 502 and the downswing path 504 corresponding to the swing of the golf club 500, FIG. 5D illustrates a second backswing path 503 and a second downswing path 505 corresponding to the swing of golf club 501. Multiple representations of swing paths permit the user to analyze and compare golf swing and make further swing corrections, if necessary. The timeline 510 may permit selecting comparison points, e.g., that occur at the same time, the same point in a swing path, and/or at predetermined swing milestones. For example, FIG. 5D illustrates a comparison of two swings at the point on the timeline 510 at which the top of the backswing occurs. By selecting a common point for comparison, a user may easily discern differences between swing paths and various swing parameters relative to another swing. Moreover, quantitative swing parameter measurements can be displayed for either (or both) swings in the exemplary swing comparison display of FIG. 5D. For example, the swing parameter prompt 508 may display an absolute swing parameter measurement for either swing, or the swing parameter prompt 508 may display relative swing parameter measurements of one swing relative to another.

Next, FIG. 5E illustrates another exemplary aspect of a swing reconstruction display. FIG. 5E is similar to the swing reconstruction display of FIG. 5D; however, the timeline 510 includes two time cursors 512 and 513, which respectively correspond to the swing reconstructions for the golf club 500 and the golf club 501. The two time cursors can be used to simultaneously display multiple swings replays as they occurred in real time. That is, different swings will vary in terms of time elapsed between address and impact, and the two time cursors will diverge on the timeline 510 due to these differences. Displaying multiple swings in real time allows for comparison of such temporal swing characteristics as swing tempo, club head speed, and the like. In this non-limiting example, the timeline 510 encompasses all points defined by both swings, with appropriate scaling to accommodate temporal differences between swings. Consequently, when playback occurs in real time, the swings of the golf club 500 and the golf club 501 may differ such that various swing milestones are achieved at different times, which enhances visual comparisons between swings. Additionally, the timeline 510 may include one or more swing "checkpoints," which may be used to evaluate a swing features at a particular swing milestone, such as top of backswing and/or impact. Additionally, the inclusion of checkpoints on the timeline 510 allows for comparison of swing characteristics for multiple swings at that point. For example, a user may easily select a checkpoint corresponding to the top of the backswing and compare shaft angle between swings. The rounded portions along the timeline 510 provide a non-limiting example of representing checkpoints/swing milestones.

Figures 5G, 5H:
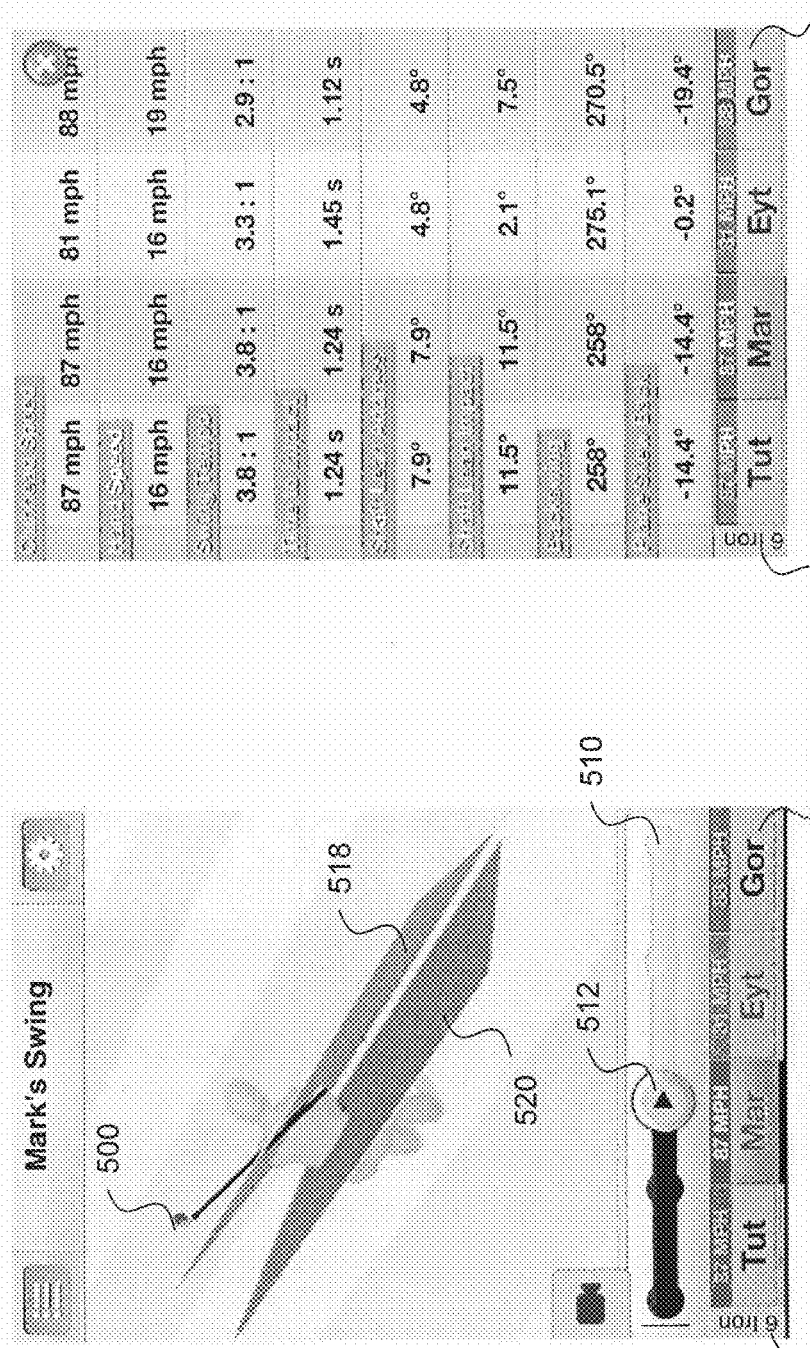

Next, FIG. 5F illustrates another exemplary aspect of a swing reconstruction display according to the present disclosure. The exemplary swing reconstruction display of FIG. 5F includes a first swing plane 518 and a second swing plane 520. Based on the reconstructed swing data, the path of the golf club 510 relative to the first swing plane 518 and the second swing plane 520 may be represented. Swing planes are known in the art as being useful tools for developing an ideal swing path. Thus, visually reconstructing a path of the golf club 500 relative to the swing plane 518 and the swing plane 520 provides for useful analysis of a golf swing. It should be appreciated that the exemplary display of FIG. 5F may easily be adapted such that multiple perspectives of the swing planes and reconstructed swing replay may be viewed, as in the top view and front view perspectives of FIGS. 5A and 5C, respectively. For example, FIG. 5G illustrates the reconstructed swing replay of FIG. 5F from a top-view perspective, which provides an alternative viewing angle when analyzing the swing path relative to the planes. The swing plane 518 and the swing plane 520 may begin and end at predetermined positions in three-dimensional space, and may be stored in advance for later display. It should be appreciated that while FIGS. 5F and 5G illustrate a planar surface as an exemplary training aid for developing an "on plane" swing, other indications of a swing plane may be represented on the swing reconstruction display. For example, a full planar surface, such as swing planes 518 and 520, may be replaced with a line/bar. Additionally, the swing planes of FIGS. 5F and 5G may be depicted as a plane of glass that "breaks," or displays a similar indicia, when the reconstructed swing passes through the plane.

Moreover, swing reconstruction displays of the present disclosure may be adapted such that other training aids are overlayed on the display for comparison to reconstructed swing path features. For example, a bar/plane substantially aligned with a target direction of the swing and orthogonal to the ground may be shown in a region above the ball to illustrate whether a swing is, e.g., coming "over the top" (i.e., breaking the plane above the ball) during downswing and/or at impact, which can assist in correcting for a swing slice. Additionally, the bar/plane may be depicted as a plane of glass that "breaks," or displays a similar indicia, when the reconstructed swing passes through the bar/plane, or when the reconstructed swing falls outside a target direction of the swing.

As another non-limiting example, one or more lines may be illustrated on the ground near the ball in the swing reconstruction display. In the case where a plurality of lines are used, the lines may be parallel and placed on opposing sides of the ball to analyze the reconstructed swing path in the times just before and after impact. As another non-limiting example, the club shaft in the swing reconstruction display may be shown to "break" or "hinge" at one or more points along the club shaft when a swing parameter and/or a portion of the reconstructed swing path deviate from an ideal parameter/path by a predetermined amount. As mentioned previously, points at which the reconstructed swing path deviates from the ideal swing may identified as swing milestones. Thus, the timeline 510 may be adapted to indicate a point at which the deviation occurs, thereby providing quick access to that point on the reconstructed swing replay.

Next, FIG. 5H illustrates another exemplary aspect of a swing reconstruction display according to the present disclosure. The exemplary display of FIG. 5H includes various swing parameters displayed in tabular form. The various swing parameters shown in the figure may be determined as in the swing parameter processing described above, and it may be displayed for multiple users and/or form of golf clubs simultaneously. While FIG. 5H illustrates non-limiting examples of swing parameters that may be displayed in tabular form for swing analysis, it should be appreciated that the illustrated swing parameters are not limiting, and the present disclosure may be easily adapted such that other swing parameters are displayed, as needed.

Figure 5J:
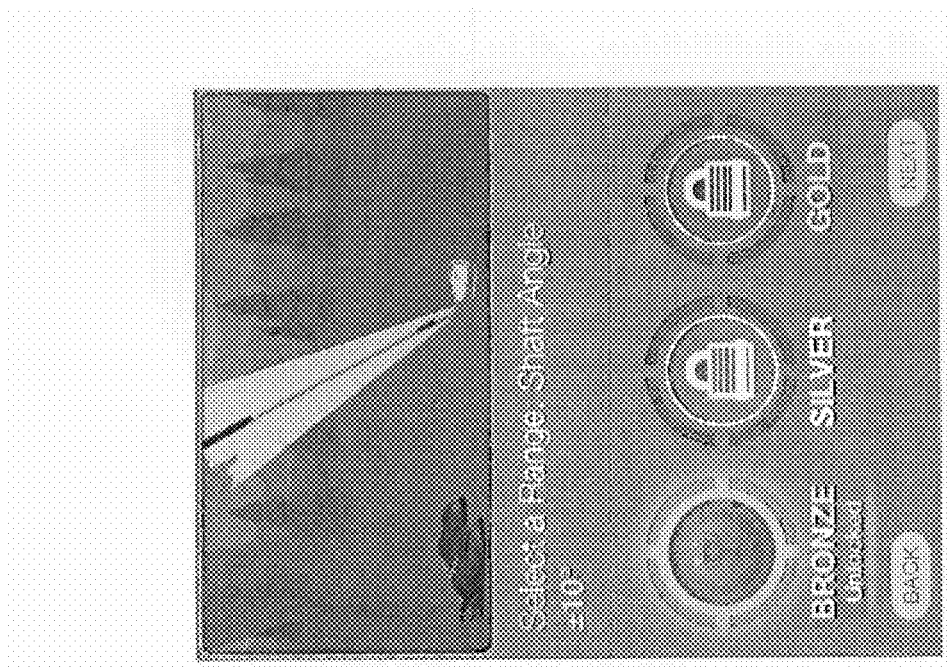
Figure 5I:
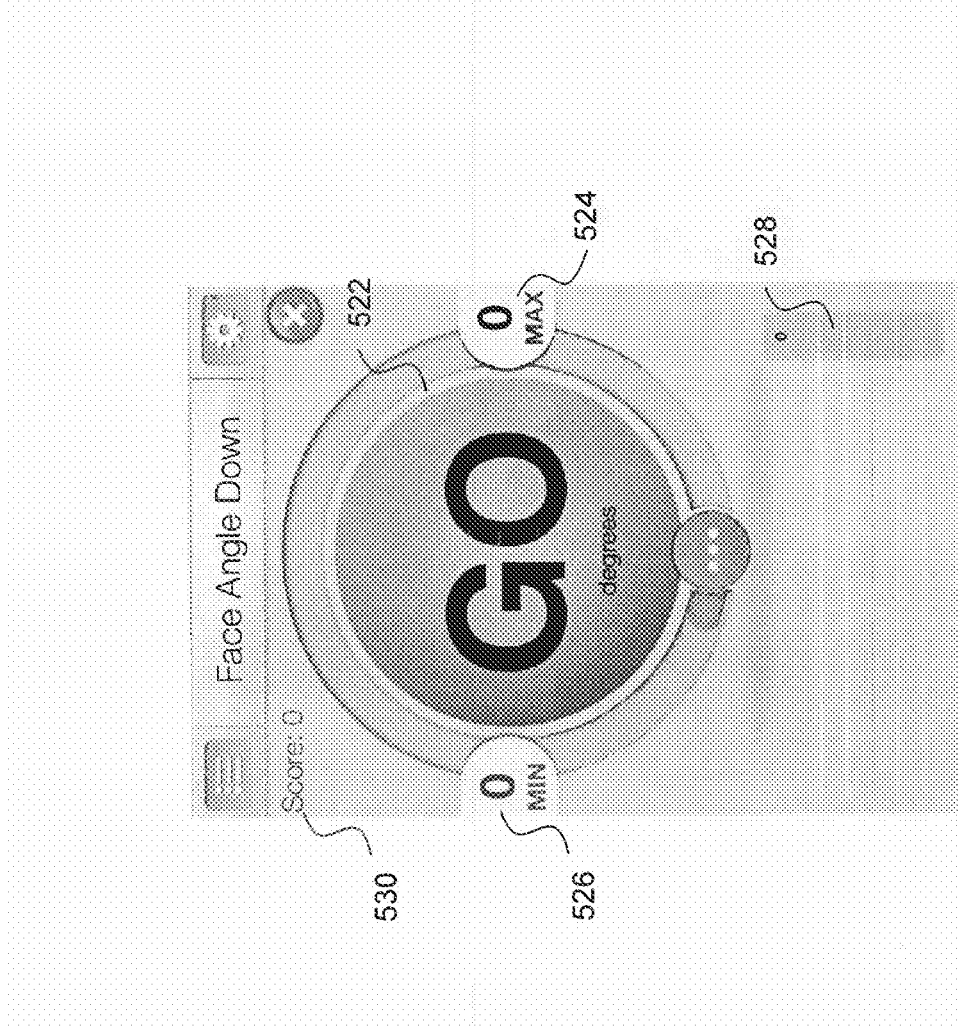

Next, FIG. 5I illustrates another exemplary aspect of a swing reconstruction display according to the present disclosure. The display shown in FIG. 5I illustrates a feedback area 522, which indicates whether a particular swing parameter was within a predetermined threshold relative to a reference parameter, based on the reconstructed swing data. In this example (referred hereinafter as a "training mode"), a golfer may choose to focus on a particular swing parameter, e.g., to practice and correct deviations of the selected swing parameter from the ideal case. In this case, the swing analysis unit 100 measures and reconstructs swing data such that the swing parameters are determined. The controller 200 may then compare the measured swing parameters from the reconstructed swing data to a predetermined reference to determine if the measured swing parameter was within threshold. If the swing parameter is within the threshold, the feedback area 522 may provide an indication as to the result. For example, when the swing parameter is within the predetermined threshold, the feedback area 522 may be shown as a green circle. Conversely, when the measured swing parameter is outside the threshold, the feedback area 522 may be displayed as a red circle. The determination and comparison of swing parameters may be performed in real time, which provides for immediate feedback when a parameter has deviated from the ideal case.

It should be appreciated that other indications may easily be implemented for use in the feedback area 522. Further, other methods for providing user feedback as to the swing parameter result may be used in the training mode. For example, an audio indication or a vibration mechanism may be used to indicate a particular outcome.

Moreover, a swing reconstruction display, such as those in FIGS. 5A-5G, may be displayed in the feedback area 522 to enhance the performance of focused real-time swing training. For example, a display such as that in FIG. 5G may be displayed in the feedback area 522, and an alert may be output (e.g., an audio alert and/or vibration) when the reconstructed swing path intersects the swing plane. Points on the reconstructed swing path corresponding to the alert times may be indicated on the display such that the user may visually determine when, where, and to what degree, the portion of the swing path deviated from the ideal case when the alert occurred. The alert may also be output at the point at which the swing begins to deviate from the ideal case, and continue until the reconstructed swing is within the ideal case threshold. For example, a vibration and/or audio alert may be output during portions of the swing that intersect the swing plane, thereby providing a physical indication of when the user's swing is "out-of-plane." This provides the benefit of developing a user's "feel" for when and how features of his/her swing are deviating from the ideal case.

As another non-limiting example, audio/mechanical cues may be output to actively train the user on improving a swing feature/parameter. For example, audio cues may be output to indicate points at which a swing milestone (e.g., top of backswing, impact, etc.) should occur in the ideal case, and the user can then attempt to match the corresponding swing milestones to the audio cues during his/her swing. Combining these active cues with the swing reconstruction display not only allows the user to actively correct a swing feature/parameter (e.g., swing tempo) in real time, but also provides the capability of retroactively viewing the swing path/parameters to visually analyze deviations from the ideal case. Additionally, a quantified comparison of the deviation from the ideal case may be displayed (e.g., 7-degrees from ideal shaft angle, 0.2 seconds slow on backswing relative to ideal tempo ratio), which cannot be done when physical swing training aids are used. That is, physical swing training aids merely provide a physical response during a swing, but rely on trial-and-error rather than quantified data to correct the swing, which decreases efficiency and usefulness.

Display area 524 and display area 526 may respectively be utilized to display the maximum reconstructed swing parameter value and the minimum reconstructed swing parameter value for a given time period. Display area 528 may be utilized to graph swing parameters through time or with respect to discrete swing events. Display area 530 may be used to score a particular round of swing parameter measurements. For example, a positive result (i.e., a swing parameter within a predetermined threshold) may be scored as a +1, while a negative result (i.e., a swing parameter outside of the predetermined threshold) may be scored as a −1. By providing focused feedback and introducing a scoring system, the embodiment shown in FIG. 5H may provide the benefit of improved user friendliness and enjoyment when performing swing analysis.

Figures 5K, 5L:
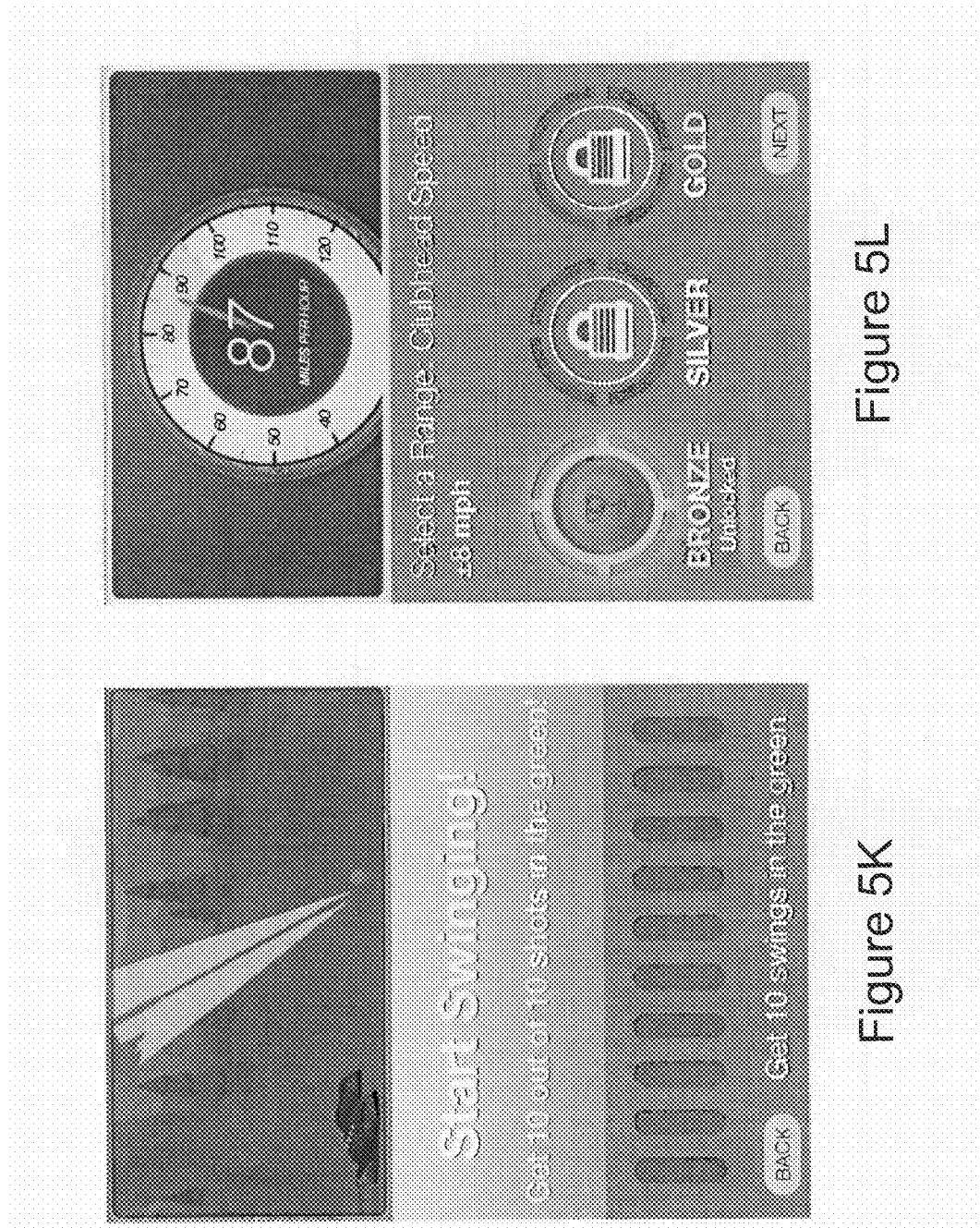

FIGS. 5J-5L provide illustrative examples of training mode screens that incorporate the above-described swing scoring aspects.

Referring first to FIG. 5J, the exemplary display shows examples of unlockable achievements that may be used in training mode as motivational tools. In this example, the user may enter a range for a swing parameter he/she wishes to focus on, and the achievements may be unlocked when a predetermined number of swings are determined to be within the selected range.

FIG. 5K provides an example of a display corresponding to unlocking one of the achievements in FIG. 5J. As shown in FIG. 5K, the user is instructed to perform ten swings, and the achievement is unlocked when all reconstructed swing data indicates each of the ten swings was within the range defined for FIG. 5J. Unlocking an achievement may also cause subsequent achievements to incorporate tighter ranges and, hence, hone swing improvement more precisely and make subsequent achievements more difficult to accomplish.

FIG. 5L provides an alternate embodiment of the display of FIG. 5J. The display of FIG. 5L illustrates a speedometer for displaying measured clubhead speed. The above-described aspects of FIGS. 5J and 5K regarding unlockable achievements may be incorporated into the display of FIG. 5L. Further, the displays of FIGS. 5J-5L may easily be altered to display a particular swing parameter in an alternate fashion, and FIGS. 5J-5L should not be construed as limiting.

The foregoing discussion of FIGS. 5A-5L provide non-limiting examples of "virtual" training aids that could be adapted for use with the present disclosure. However, it should be appreciated that the present disclosure may easily be adapted to include other "virtual" training aids that may simulate physical swing training aids.

Figure 6:
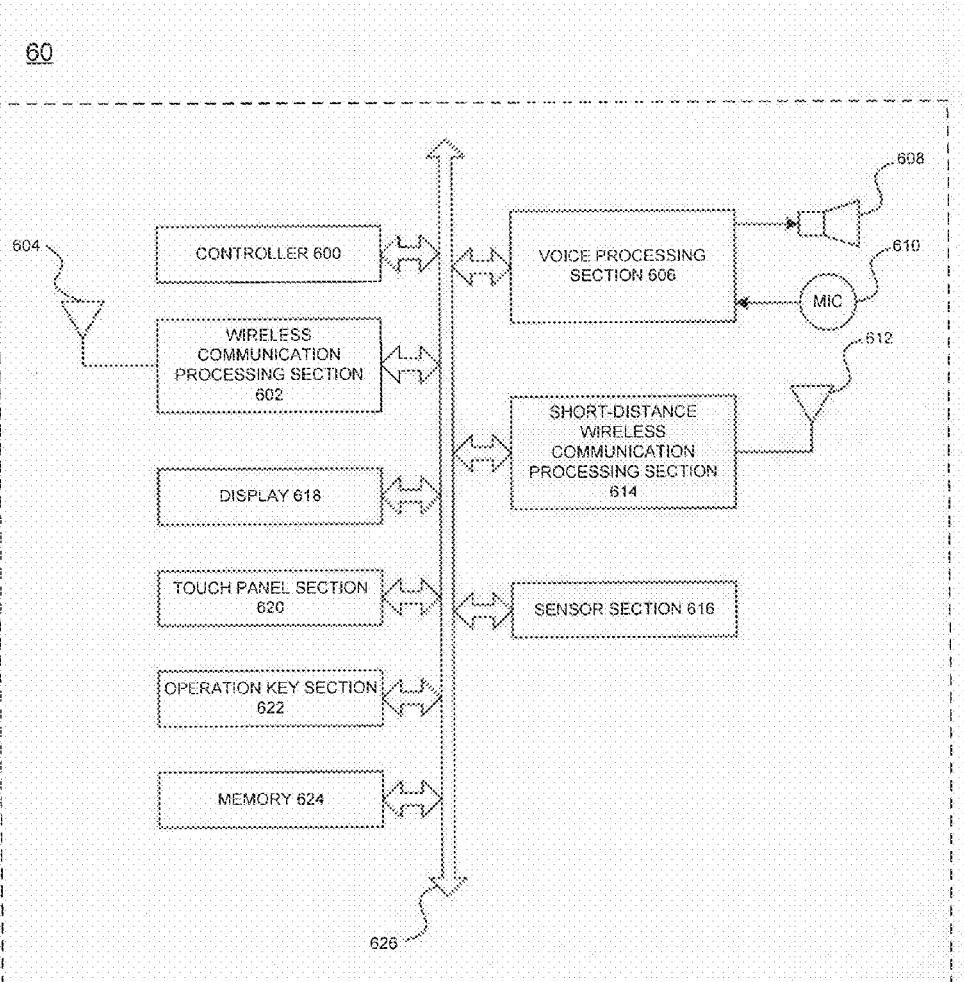
FIG. 6 illustrates an exemplary hardware embodiment of the present disclosure.

Next, FIG. 6 illustrates an exemplary schematic block diagram of an exemplary hardware embodiment of the present disclosure. As stated previously, the motion analysis and reconstruction features described herein may be implemented such that the motion analysis unit 100 measures inertial motion data, and outputs the motion data to an external mobile device, such as mobile phone terminal device 60 shown in FIG. 6. As a non-limiting example of the data flow in this exemplary embodiment, the motion analysis unit 100 may measure and store motion data, e.g., from the gyroscope 202 and the accelerometer 204, during a golf swing, and output the raw sensor data to the mobile phone terminal device 60. The raw sensor data may be output by the motion analysis unit 100 as a batch process (e.g., raw sensor data for a time period defined by a golf swing is output following detection of swing completion), or the raw sensor data may be output continuously in real-time. In response to receiving the raw sensor data, the mobile phone terminal device 60 may perform the above-described motion analysis and reconstruction features of the present disclosure. For example, the mobile phone terminal device 60 may perform any of the processes described for FIG. 3 such that a time-series reconstructed swing data model is created to describe the spatial position and orientation of a golf club during a swing. The reconstructed swing data may then be used by the mobile phone terminal device 60 to graphically reconstruct a swing replay, and display the reconstructed swing replay such that a visual swing analysis may be performed. See, e.g., FIGS. 5A-I.

Referring to FIG. 6, the mobile phone terminal device 60 may include an antenna 604 and a wireless communication processing section 602. The wireless communication processing section 602 may communicate wirelessly via radio signals, or the like, with other mobile devices via, e.g., a base station. Further, a data signal, such as a voice transmission from another user, may be received by antenna 604 and sent to the wireless communication processing section 602 for further processing. In the case of an incoming voice transmission, the voice data signal may be sent from the wireless communication processing section 602 to a voice processing section 606. Incoming voice data received by the voice processing section 606 via the wireless communication processing section 602 may be output as sound via a speaker 608.

Conversely, an outgoing voice signal may be supplied by a user to the voice processing section 606 via a microphone 610. The voice signal received via microphone 610 and processed by the voice processing section 606 may be sent to wireless communication processing section 602 for transmission by the antenna 604.

A second antenna 612 may be supplied for use with a short-distance wireless communication processing section 614. The short-distance wireless communication processing section 614 may communicate wirelessly with other devices over a network, such as the Internet, a local area network (LAN), or a wide area network (WAN). The second antenna 612 may, e.g., by a Wi-Fi or a Bluetooth transceiver. Allowing communication with other devices over a network permits the results of reconstructed swings to be easily shared with others. For example, information associated with a reconstructed swing may be transmitted to a device used by a swing coach. Additionally, reconstructed swing data may be sent to a Web server, thereby permitting further access to the data. The reconstructed swing data may also be distributed across the network as part of a game or contest where others with similar motion analysis units share or compare reconstructed swings as part of the game or contest.

A sensor section 616 may be provided for the mobile phone terminal device 60. The sensor section 616 may be a motion sensor that detects a motion of an object in the proximity of the mobile phone terminal device 60. The motion may correspond to a user moving an instruction object, such as a finger or stylus, in the proximity of the mobile phone terminal device 60 for the purpose of selecting data displayed on display 618. The sensor section 616 may additionally include sensors for detecting motion of the mobile phone terminal device 60. For example, the sensor section 616 may include a gyroscope and/or accelerometer to measure rotation and acceleration aspects of the mobile phone terminal device 60. The motion data measured by the sensor section 616 may be used, e.g., to rotate the display 618 output based on an orientation of the mobile phone terminal device 60. Further, the sensor section 616 motion data may be utilized to perform the above-described initial orientation calibration.

The mobile phone terminal device 60 may include the display 618. The display 618 may be, e.g., a liquid crystal display (LCD) panel, an organic electroluminescent (OLED) display panel, a plasma display panel, or the like. In addition to displaying reconstructed swing replays, the display 618 may, e.g., display text, an image, a web page, a video, or the like. For example, when the mobile phone terminal device 60 connects with the Internet, the display 618 may display text and/or image data which is transmitted from a web server in Hyper Text Markup Language (HTML) format and displayed via a web browser. The display 618 may additionally display data stored in a memory 624.

A touch panel section 620 can detect a touch operation on the surface of the display 618. For example, the touch panel section 620 can detect a touch operation performed by an instruction object, such as a finger or stylus. Touch operations may correspond to user inputs, such as a selection of an icon or a character string displayed on the display 618. The touch panel section 620 may be an electrostatic capacitance type device, a resistive type touch panel device, or other such type devices for detecting a touch on a display panel.

The touch panel section 620 may perform processing related to touch operation classification. For example, the touch panel section 620 may assign a predetermined function to be performed when a "tap" touch operation is detected. Similarly, the touch panel section may analyze a touch operation in which the instruction object makes continuous contact with the display 618 while moving the instruction object around the display 618 (e.g., a "swipe" operation). The touch panel section 620 may output a signal based on a classification of the touch operation performed. The signal may, e.g., include information indicating the touch operation classification, the location on the display 618 where the touch operation was performed, and the operation to be performed based on the touch operation.

Data which is detected and processed by the touch panel section 620 can be transmitted to a controller 600. The controller 600 may include one or more processor units and can control each element of the mobile phone terminal device 60 based on data detected by the touch panel section 620, or by inputs received from operation key section 622. The operation key section 622 may receive inputs, e.g., from external control buttons included with the mobile phone terminal device 60. The external control buttons may, e.g., control the volume, the power, or a hold operation for the mobile phone terminal device 60.

The controller 600 may execute instructions stored in the memory 624. To this end, the memory 624 may be a non-transitory computer readable medium having instructions stored therein for controlling the mobile phone terminal device 60. Further, the controller 600 may include one or more processors for executing the instructions stored on the memory 624. The memory 624 may additionally store classification tables and character string tables, which are described in detail in later paragraphs with respect to the non-limiting examples illustrated in FIG. 4. In one aspect, the controller 600 may utilize the classification tables and/or the character string tables stored in the memory 624 in executing instructions for the mobile phone terminal device 60. However, the processing features of the controller 600 are not limited to using such tables, and other methods of performing these features may be utilized.

Elements of the mobile phone terminal device 60 can communicate via a bus 626. The bus 626 may be used to transmit control data from the controller 600. Additionally, the bus 626 may be used for the transmission of voice data, display data, or the like, throughout the various elements of the mobile phone terminal device 60.

Obviously, numerous modifications and variations of the present disclosure are possible in light of the above teachings. It is therefore to be understood that within the scope of the appended claims, the present disclosure may be practiced otherwise than as specifically described herein. For example, advantageous results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, some implementations may be performed on modules or hardware not identical to those described. Accordingly, other implementations are within the scope that may be claimed.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process.

It must be noted that, as used in the specification and the appended claims, the singular forms "a," "an," and "the" include plural referents unless the context clearly dictates otherwise.

The invention claimed is:

1. An information processing apparatus comprising:
   circuitry configured to
      acquire information corresponding to a reference orientation that indicates a spatial position of a sensor unit attached to a golf club;
      acquire a measurement signal generated by the sensor unit in response to a movement of the golf club, the measurement signal including measurements of one or more of an angular acceleration, a linear acceleration, and an angular velocity;
      detect when a measurement included in the measurement signal exceeds a maximum measurement range of the sensor unit, determine an extrapolated value for the measurement, and append the extrapolated value to the measurement signal;
      generate data corresponding to a motion path of the golf club based on the measurement signal and the reference orientation; and
      control an interface to output the generated data corresponding to the motion path,
   wherein the reference orientation is determined based on a vector projecting in a normal direction from a planar surface of the golf club.

2. The information processing apparatus of claim 1, wherein the planar surface is a club face of the golf club.

3. The information processing apparatus of claim 1, further comprising:
   a memory configured to store the reference orientation.

4. The apparatus of claim 1, wherein:
   the circuitry is further configured to
      detect a first impact point, the first impact point being a point during the movement of the golf club where the golf club impacts a first object; and
      calculate a timeline beginning at a detected start of the movement of the golf club and ending at the detected first impact point.

5. The apparatus of claim 4, wherein:
   the circuitry is further configured to
      detect a second impact point, the second impact point being a point prior to the first impact point where the golf club impacts a second object; and
      calculate an impact quality by determining, based on the measurement signal, an amount of flex in a shaft of the golf club at the second impact point.

6. The apparatus of claim 1, wherein the measurement signal includes a time series of position, acceleration, and rotation for a plurality of points on the golf club during the movement of the golf club.

7. The apparatus of claim 1, wherein:
   the golf club includes a first point aligned on a common axis with a second point, and
   the circuitry is further configured to detect a deflection of the golf club by determining, based on the measurement signal, an amount at which the first point and the second point are offset from the common axis during the movement of the golf club.

8. The apparatus of claim 1, wherein
   the data corresponding to a motion path of the golf club corresponds to a swing of the golf club.

9. The apparatus of claim 4, wherein:
   the data corresponding to a motion path of the golf club corresponds to a swing of the golf club,
   the first impact point corresponds to a position at which the golf club strikes a golf ball, and
   the detected start of the movement of the golf club corresponds to an address point, the address point being a position at which the measurement signal indicates substantially zero motion of a head of the golf club.

10. The apparatus of claim 9, wherein:
    the circuitry is further configured to calculate a timeline beginning at the address point and ending at the first impact point, and
    the timeline is included in the measurement signal as a time series of position, acceleration, and rotation for a plurality of points on the golf club during the swing.

11. The apparatus of claim 10, wherein:
    the swing of the golf club includes a backswing and a downswing, and
    the data corresponding to a motion path of the golf club corresponds to the backswing and the downswing in relation to the head of the golf club.

12. The apparatus of claim 8, wherein the circuitry is further configured to calculate, based on the data corresponding to the motion path, an angle of a shaft of the golf club during the swing relative to a predetermined reference axis.

13. The apparatus of claim 8, wherein the circuitry is configured to calculate, based on the data corresponding to the motion path, an angle of a face of the golf club during the swing relative to a predefined reference axis.

14. The apparatus of claim 1, wherein the circuitry is configured to control the interface such that a replay of the motion path is displayed, based on the data corresponding to the motion path.

15. The apparatus of claim 14, further comprising:
a memory is configured to store the generated data corresponding to the motion path as a first golf swing, wherein
the circuitry is further configured to generate, based on the reference orientation and a second measurement signal including measurements of one or more of an angular acceleration, a linear acceleration, and an angular velocity during a second movement of the golf club, data corresponding to a second golf swing of the golf club, and
the circuitry is further configured to control the interface such that the interface overlays, based on the stored first golf swing and the data corresponding to the second golf swing, a replay of the second golf swing on a replay of the first golf swing.

16. The apparatus of claim 14, wherein:
the circuitry is further configured to control the interface such that a planar surface is overlayed on the replay of the motion path, and
the circuitry is further configured to indicate, based on the data corresponding to the motion path, areas of the golf club that intersect the planar surface during the replay of the motion path.

17. The apparatus of claim 9, wherein:
the circuitry is further configured to calculate swing parameters based on the data corresponding to the motion path, the swing parameters including one or more of a shaft lean at the address point, a shaft lean at the first impact point, a speed of the golf club's head in the motion path, and an angle of the golf club's face at the first impact point.

18. The apparatus of claim 17, wherein the circuitry is configured to control the display such that the calculated swing parameters are overlayed on a replay of the motion path.

19. The apparatus of claim 17, wherein:
the circuitry is further configured to receive an input corresponding to a selected swing parameter, of the calculated swing parameters,
in response to receiving the input corresponding to the selected swing parameter, the circuitry is configured to control the display to output a feedback area indicating, based on the data corresponding to the motion path, whether a calculated measurement of the selected swing parameter is within a predetermined tolerance.

20. The apparatus of claim 4, wherein the timeline includes one or more milestones, the one or more milestones corresponding to predetermined reference positions along the motion path of the golf club.

21. The apparatus of claim 20, wherein:
the circuitry is configured to
calculate a second timeline including a second set of one or more milestones corresponding to a second motion path of the golf club, the one or more second milestones corresponding to the predetermined reference positions along the second motion path of the golf club; and
control the interface to simultaneously display a snapshot of the motion path of the golf club and the second motion path of the golf club at one of the predetermined reference positions based on the calculated first and second timelines.

22. A method comprising:
acquiring information corresponding to a reference orientation that indicates a spatial position of a sensor unit attached to a golf club;
acquiring a measurement signal generated by the sensor unit in response to a movement of the golf club, the measurement signal including measurements of one or more of an angular acceleration, a linear acceleration, and an angular velocity;
detecting when a measurement included in the measurement signal exceeds a maximum measurement range of the sensor unit, determine an extrapolated value for the measurement, and append the extrapolated value to the measurement signal;
generating, by circuitry, data corresponding to a motion path of the golf club, based on the measurement signal and the reference orientation; and
controlling an interface to output the generated data corresponding to the motion path, wherein
the reference orientation is determined based on a vector projecting in a normal direction from a planar surface of the golf club.

23. A non-transitory computer-readable medium having instruction stored therein that when executed by a processor, causes the processor to perform a method comprising:
acquiring information corresponding to a reference orientation that indicates a spatial position of a sensor unit attached to a golf club;
acquiring a measurement signal generated by the sensor unit in response to a movement of the golf club, the measurement signal including measurements of one or more of an angular acceleration, a linear acceleration, and an angular velocity;
detecting when a measurement included in the measurement signal exceeds a maximum measurement range of the sensor unit, determine an extrapolated value for the measurement, and append the extrapolated value to the measurement signal;
generating data corresponding to a motion path of the golf club, based on the measurement signal and the reference orientation; and
controlling an interface to output the generated data corresponding to the motion path, wherein
the reference orientation is determined based on a vector projecting in a normal direction from a planar surface of the golf club.

* * * * *